(12) United States Patent
Chiang et al.

(10) Patent No.: US 6,369,148 B2
(45) Date of Patent: *Apr. 9, 2002

(54) OXYGEN-SCAVENGING COMPOSITIONS AND ARTICLES

(75) Inventors: Weilong L. Chiang, Naperville; Boh C. Tsai, Inverness; Stephen Y. Chen, Wheaton, all of IL (US); Lakshmi N. Venkateshwaran, Freehold, NJ (US)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,043

(22) Filed: Mar. 18, 1998

Related U.S. Application Data

(60) Continuation-in-part of application No. 08/483,302, filed on Jun. 7, 1995, now Pat. No. 5,744,056, which is a continuation-in-part of application No. 08/249,758, filed on May 25, 1994, now abandoned, which is a division of application No. 08/092,722, filed on Jul. 16, 1993, now abandoned.

(51) Int. Cl.$^7$ .............................................. C01B 3/00
(52) U.S. Cl. .................................. 524/417; 252/188.28
(58) Field of Search ............................... 524/417, 435, 524/440; 206/459.1, 524.4, 524.6, 811, 524.1, 204, 569, 913; 428/327, 329, 330; 426/133, 415, 135, 271; 252/188.28

(56) References Cited

U.S. PATENT DOCUMENTS

| | | | |
|---|---|---|---|
| 2,705,227 A | * 3/1955 | Stamatoff | 524/413 |
| 2,825,651 A | * 3/1958 | Loo et al. | 252/188.28 |
| 3,099,350 A | * 7/1963 | Hammond | 206/46 |
| 3,549,585 A | * 12/1970 | Solomon | 260/40 |
| 4,104,192 A | * 8/1978 | Yoshikawa et al. | 252/188 |
| 4,130,551 A | 12/1978 | Bockrath et al. | 528/481 |
| 4,366,179 A | * 12/1982 | Nawata et al. | 426/395 |
| 4,384,972 A | * 5/1983 | Nakamura et al. | 252/188.21 |
| 4,524,015 A | * 6/1985 | Takahashi et al. | 252/188.28 |
| 4,588,561 A | * 5/1986 | Aswell et al. | 252/188.28 |
| 4,769,175 A | * 9/1988 | Inoue | 252/188.28 |
| 4,792,484 A | * 12/1988 | Moritani | 206/204 |
| 4,856,650 A | * 8/1989 | Inou | 206/204 |
| 4,960,639 A | * 10/1990 | Oda et al. | 428/36.7 |
| 5,128,060 A | * 7/1992 | Ueno et al. | 252/188.28 |
| 5,147,631 A | 9/1992 | Glajch et al. | 424/9 |
| 5,153,038 A | * 10/1992 | Koyana et al. | 428/35.8 |
| 5,744,056 A | * 4/1998 | Venkateshwaran et al. | 252/188.28 |
| 5,806,681 A | * 9/1998 | Frisk | 206/524.3 |

FOREIGN PATENT DOCUMENTS

| | | | |
|---|---|---|---|
| CA | 2178111 | 5/1996 | |
| DE | 2742874 | 4/1979 | |
| FR | 2129844 | 11/1972 | |
| GB | 1556853 | 11/1979 | |
| JP | 60-158257 | * 8/1985 | 524/440 |
| JP | A01176419 | 12/1987 | |
| JP | A04090847 | 3/1997 | |
| JP | A04090848 | 3/1997 | |

OTHER PUBLICATIONS

Active Packaging Films And Susceptors, UNCTAD/GATT, Geneva XP 000574239.

Packaging Progress Report on NDC/PEN and Oxygen Scavenger Concentrates (Part**; Oxygen Scavenger Concentrates) by Boh C. Tsai, Jun. 19, 1997.

* cited by examiner

Primary Examiner—Veronica P. Hoke
(74) Attorney, Agent, or Firm—Tyler A. Stevenson

(57) ABSTRACT

Oxygen-scavenging compositions comprising an oxidizable metal component, an electrolyte component and a solid, non-electrolytic, acidifying component. When blended with soft, flexible polymeric resins, these compositions exhibit good oxygen-scavenging performance with improved oxidation efficiency relative to compositions containing an oxidizable metal component, an electrolyte, and an acidifying component combined with a more rigid thermoplastic resins. Selection of a thermally stable non-electrolytic, acidifying component is important when melt compounding the compositions into polymeric resins and particularly for extrusion coating applications. The compositions can be used directly as an oxygen absorbent resin melt-fabricated into a wide variety of oxygen-scavenging packaging articles or as concentrates in combination with other thermoplastic resins.

5 Claims, No Drawings

OXYGEN-SCAVENGING COMPOSITIONS AND ARTICLES

This is a continuation-in-part of copending application Ser. No. 08/483,302 filed Jun. 7, 1995, now U.S. Pat. No. 5,744,056 which is a continuation-in-part of application Ser. No. 08/249,758 filed May 25, 1994, now abandoned, which is a divisional of application Ser. No. 08/092,722 filed Jul. 16, 1993, now abandoned.

FIELD OF THE INVENTION

This invention relates to oxygen-scavenging compositions having utility in packaging and other applications.

BACKGROUND OF THE INVENTION

Products sensitive to oxygen, particularly foods, beverages and medicines, deteriorate or spoil in the presence of oxygen. One approach to reducing these difficulties is to package such products with packaging materials containing at least one layer of a so-called "passive" gas barrier film that can act as a physical barrier to transmission of oxygen but does not react with oxygen. Films obtained from ethylene vinyl alcohol copolymer (EVOH) or polyvinylidene dichloride (PVDC) are commonly used for this purpose due to their excellent oxygen barrier properties. By physically blocking transmission of oxygen, these barrier films can maintain or substantially maintain initial oxygen levels within a package. Because passive barrier films can add cost to a packaging construction and do not reduce levels of oxygen already present in the packaging construction, however, there is a need for effective, lower cost alternatives and improvements.

An approach to achieving or maintaining a low oxygen environment inside a package is to use a packet containing an oxygen absorbent material. The packet, also sometimes referred to as a pouch or sachet, is placed in the interior of the package along with the product. Sakamoto et al. discloses oxygen absorbent packets in Japan Laid Open Patent Application No. 121634/81 (1981). A typical ingredient used in the oxygen scavenger carried in the packet is reduced iron powder which can react with oxygen to form ferrous oxide or ferric oxide, as disclosed in U.S. Pat. No. 4,856,650. Also, it is known to include in the packet, along with iron, a reaction promoter such as sodium chloride, and a water-absorbing agent, such as silica gel, as described in U.S. Pat. No. 4,992,410. Japan Laid Open Patent Application No. 82-24634 (1982) discloses an oxygen absorber composition comprising 100 parts by weight (pbw) iron powder, 2 to 7 pbw ammonium chloride, 8 to 15 pbw aqueous acid solution and 20 to 50 pbw of a slightly water soluble filler such as activated clay. Japan Laid Open Patent Application No. 79-158386 (1979) discloses an oxygen arresting composition comprising a metal, such as iron, copper or zinc, and optionally, a metal halide such as sodium chloride or zinc chloride at a level of 0.001 to 100 pbw to 1 pbw of metal and a filler such as clay at a level of 0.01 to 100 pbw to 1 pbw of metal.

Although oxygen absorbent or scavenger materials used in packets can react chemically with oxygen in the package, also sometimes referred to as "headspace oxygen", they do not prevent external oxygen from penetrating into the package. Therefore, it is common for packaging in which such packets are used to include additional protection such as wrappings of passive barrier films of the type described above. This adds to product costs. With many easy-to-prepare foods, another difficulty with oxygen scavenger packets is that consumers may mistakenly open them and consume their contents together with the food. Moreover, the extra manufacturing step of placing a packet into a container can add to the cost of the product and slow production. Further, oxygen absorbent packets are not useful with liquid products.

In view of these disadvantages and limitations, it has been proposed to incorporate directly into the walls of a packaging article a so-called "active" oxygen absorber, i.e., one that reacts with oxygen. Because such a packaging article is formulated to include a material that reacts with oxygen permeating its walls, the packaging is said to provide an "active-barrier" as distinguished from passive barrier films which block transmission of oxygen but do not react with it. Active-barrier packaging is an attractive way to protect oxygen-sensitive products because it not only can prevent oxygen from reaching the product from the outside but also can absorb oxygen present within a container.

One approach for obtaining active-barrier packaging is to incorporate a mixture of an oxidizable metal (e.g., iron) and an electrolyte (e.g., sodium chloride) into a suitable resin, melt process the result into monolayer or multilayer sheets or films and form the resulting oxygen scavenger-containing sheets or films into rigid or flexible containers or other packaging articles or components. This type of active-barrier is disclosed in Japan Laid Open Patent Application No. 56-60642 (1981), directed to an oxygen-scavenging sheet composed of a thermoplastic resin containing iron, zinc or copper and a metal halide. Disclosed resins include polyethylene and polyethylene terephthalate. Sodium chloride is the preferred metal halide. Component proportions are such that 1 to 500 parts metal halide are present per 100 parts resin and 1 to 200 parts metal halide are present per 100 parts metal. Similarly, U.S. Pat. No. 5,153,038 discloses plastic multilayer vessels of various layer structures formed from a resin composition formed by incorporating an oxygen scavenger, and optionally a water absorbing agent, in a gas barrier resin. The oxygen scavenger can be a metal powder such as iron, low valence metal oxides or reducing metal compounds. The oxygen scavenger can be used in combination with an assistant compound such as a hydroxide, carbonate, sulfite, thiosulfite, tertiary phosphate, secondary phosphate, organic acid salt or halide of an alkali metal or alkaline earth metal. The water absorbing agent can be an inorganic salt such as sodium chloride, calcium chloride, zinc chloride, ammonium chloride, ammonium sulfate, sodium sulfate, magnesium sulfate, disodium hydrogenphosphate, sodium dihydrogenphosphate, potassium carbonate or sodium nitrate. The oxygen scavenger can be present at 1 to 1000 weight % based on weight of the barrier resin. The water absorbing agent can be present at 1 to 300 weight % based on weight of the barrier resin.

One difficulty with scavenger systems incorporating an oxidizable metal (e.g., iron) and a metal halide (e.g., sodium chloride) into a thermoplastic layer is the inefficiency of the oxidation reaction. To obtain sufficient oxygen absorption in active-barrier packaging, high loadings of scavenger composition are often used. This typically requires that sheets, films and other packaging layer or wall structures containing a scavenging composition be relatively thick. This, in turn, contributes to cost of the packaging material and may preclude attainment of thin packaging films having adequate oxygen-scavenging capabilities.

Another oxygen-scavenging composition, disclosed in U.S. Pat. No. 4,104,192, comprises a dithionite and at least one compound having water of crystallization or water of hydration. Listed among these compounds are various hydrated sodium salts, including carbonate, sulfate, sulfite and phosphates; sodium pyrophosphate decahydrate is specifically mentioned. As disclosed in Table 1, Example 1 of the patent, sodium pyrophosphate decahydrate was the least effective of the compounds tested. In addition, use of hydrate containing compounds may not suitable in oxygen-scavenging resins that require high temperature processing. Thus, while a variety of approaches to maintaining or reducing oxygen levels in packaged items have been advanced, there remains a need for improved oxygen-scavenging compositions and packaging materials utilizing the same.

An object of the present invention is to provide improved oxygen-scavenging compositions and packaging. Another object is to provide low cost, oxygen-scavenging compositions of improved efficiency. Another object is to provide oxygen-scavenging compositions that can be used effectively, even at relatively low levels, in a wide range of active-barrier packaging films and sheets, including laminated and coextruded multilayer films and sheets. Another object is to provide active-barrier packaging containers that can increase the shelf-life of oxygen-sensitive products by slowing the passage of external oxygen into the container, by absorbing oxygen present inside the container or both. Other objects will be apparent to those skilled in the art.

SUMMARY OF THE INVENTION

These objects can be attained according to the invention by providing oxygen-scavenging compositions comprising at least one oxidizable metal component, at least one electrolyte component and at least one solid, non-electrolytic acidifying component. Optionally, a water-retentive binder and/or polymeric resin can be included in the composition, if desired. For particularly efficient oxygen absorption and cost effective formulations, the oxidizable metal component comprises iron, the electrolyte component comprises sodium chloride and the solid, non-electrolytic, acidifying component comprises sodium acid pyrophosphate. In one embodiment, the invented compositions are provided in the form of a powder or granules for use in packets. In another embodiment, the compositions include or are added to a thermoplastic resin and are used in fabrication of articles by melt processing methods. Concentrates comprising the compositions or their components and at least one thermoplastic resin also are provided and offer advantages in melt processing operations. For the embodiments that include a thermoplastic resin, thermally stable acidifying components are preferred and provide a more aesthetically pleasing film or article. Preferred thermoplastic resins are soft, flexible resins which enable the oxygen-scavenging composition to absorb oxygen more efficiently. The invented compositions also are provided in the form of packaging structures and components thereof.

As used herein, the term "electrolyte compound" means a compound which substantially dissociates in the presence of water to form positive and negative ions. By "solid, non-electrolytic acidifying component" or, simply, "acidifying component," is meant a component comprising a material which is normally solid and which, in dilute aqueous solution, has a pH less than 7 and disassociates only slightly into positive and negative ions.

DESCRIPTION OF THE INVENTION

The invented compositions are oxygen-scavenging compositions that exhibit improved oxygen-absorption efficiency relative to known, oxidizable metal-electrolyte systems, such as iron and sodium chloride, as a result of inclusion in the compositions of a non-electrolytic, acidifying component. In the presence of moisture, the combination of the electrolyte and the acidifying components promotes reactivity of metal with oxygen to a greater extent than does either alone. Consequently, oxygen absorption efficiency of the invented compositions is greater than that of known compositions. For a given weight of oxygen-scavenging composition, the invented compositions provide greater scavenging capability than conventional materials, other things being equal. Alternatively, less of the invented composition is needed to provide a given level of oxygen-scavenging capability than if conventional materials are used, other things being equal.

Advantageously, when incorporated into thermoplastic resins used for making packaging articles and components, the improved efficiency of the invented compositions can lead to reductions in not only oxygen scavenger usage but, also, resin usage because the lower loading levels permitted by the invented compositions facilitate downgauging to thinner or lighter weight packaging structures.

Another advantage of the invented compositions when used in fabrication of articles by melt processing is that one or more of the components of the composition can be provided in the form of a concentrate in a thermoplastic resin, thereby facilitating convenient use of the compositions and tailoring of scavenging compositions to particular product requirements.

The oxygen-scavenging composition of the present invention comprises an oxidizable metal component, an electrolyte component, and a solid, non-electrolytic, acidifying component. Optionally, the composition also comprises a water-absorbing binder component. The composition can also comprise a polymeric resin if desired. The composition can be packaged in an enclosure to form a packet suitable for placement in the interior of a package. The enclosure can be made from any suitable material that is permeable to air but not permeable to the components of the oxygen-scavenging composition or the product to be packaged to a degree that would allow intermingling of the oxygen-scavenging composition with products with which it might be packaged. Suitably, the enclosure is constructed of paper or air-permeable plastic. The composition also can be incorporated into polymeric resins for use in making fabricated articles, for example by melt processing, spraying and coating techniques.

Suitable oxidizable metal components comprise at least one metal or compound thereof capable of being provided in particulate or finely divided solid form and of reacting with oxygen in the presence of the other components of the composition. For compositions to be used in packaging applications, the component also should be such that, both before and after reaction with oxygen, it does not adversely affect products to be packaged. Examples of oxidizable metals include iron, zinc, copper, aluminum, and tin. Examples of oxidizable metal compounds include ferrous sulfate, cuprous chloride and other iron (II) and copper (I) salts as well as tin (II) salts. Mixtures also are suitable. Oxidizable metal components consisting entirely or mostly of reduced iron powder are preferred because they are highly effective in terms of performance, cost and ease of use.

The invented compositions also comprise an electrolyte component and a solid, non-electrolytic, acidifying component. These components function to promote reaction of the oxidizable metal with oxygen. While either such component promotes oxidation in the absence of the other, the combination is more effective than either alone.

Suitable electrolyte components comprise at least one material that substantially disassociates into positive and negative ions in the presence of moisture and promotes reactivity of the oxidizable metal component with oxygen. Like the oxidizable metal component, it also should be capable of being provided in granular or powder form and, for compositions to be used in packaging, of being used without adversely affecting products to be packaged. Examples of suitable electrolyte components include various electrolytic alkali, alkaline earth and transition metal halides, sulfates, nitrates, carbonates, sulfites and phosphates such as sodium chloride, potassium bromide, calcium carbonate, magnesium sulfate and cupric nitrate. Combinations of such materials also can be used. A particularly preferred electrolyte component, both for its cost and performance, is sodium chloride.

The acidifying component comprises a solid, non-electrlytic compound that produces an acidic pH, i.e., less than 7, preferably less than 5, in dilute aqueous solution. The component disassociates into positive and negative ions only slightly in aqueous solution. As with the oxidizable metal and electrolyte components, for compositions to be used in packaging applications, the acidifying component should be capable of being used without adversely affecting products to be packaged. For applications in which the invented compositions include or are to be used with a thermoplastic resin, the acidifying component also should have sufficient thermal stability to withstand melt compounding, processing, and fabrication into the final article or film. The term thermal stability as used herein means that the acidifying component decomposes only insubstantially, if at all, at the normal processing temperature of the polymer from which the film or article is fabricated. The acidifier is considered to have decomposed when it no longer functions for its intended purpose or the films and articles fabricated from the thermoplastic resin contain a significant number of bubbles and voids due to the loss of water or hydrate. For example, some acidifying components have a thermal decomposition temperature below typical thermoplastic processing temperatures. Thus, when these acidifying components are blended into the polymer they thermally decompose into another material and no longer act as an acidifier. Other acidifying components will not thermally decompose and continue to function as acidifiers, but may lose water or hydrate at higher processing temperatures. This loss of water or hydrate during fabrication will cause voids or bubbles to appear in the final film or article.

Suitable materials include various organic and inorganic acids and their salts. Depending on the end-use application, particular groups of acidifying components are preferred. For the embodiment directed to use in a packet or sachet, organic acids and their salts can be used. For example citric acid, anhydrous citric acid, citric acid monosodium salt, citric acid disodium salt, salicylic acid, ascorbic acid, tartaric acid, ammonium sulfate, ammonium phosphate, nicotinic acid, aluminum ammonium sulfate and sodium phosphate monobasic. Combinations of such materials may also be used. These acidifying components are not preferred for use in resin applications because their thermal decomposition temperature is below the compounding temperature of common packaging resins. The thermal decomposition temperature of some common organic acids are as follows: salicylic acid (98° C.); citric acid (175° C.); ascorbic acid (193° C.); and tartaric acid (191° C.).

When the oxygen-scavenging compositions of the present invention are compounded into thermoplastic resins such as polyethylene, using polymer compounding or melt-fabrication operations, preferred acidifying components are those that are thermally stable—i.e., do not thermally decompose and do not lose water or hydrate—at typical film processing temperatures which range from about 200° C. to about 260° C. Examples include: potassium acid pyrophosphate, calcium acid pyrophosphate, monocalcium phosphate, disodium dihydrogen pyrophosphate, also known as sodium acid pyrophosphate, sodium metaphosphate, sodium trimetaphosphate, sodium hexametaphosphate, aluminum sulfate and aluminum potassium sulfate. Combinations of these materials may also be used. The dehydration temperature of sodium acid pyrophosphate and monocalcium phosphate is 266° C. and 235° C. respectively.

It has been discovered that although these acidifying components are thermally stable at normal resin processing temperatures, they are less stable at higher processing temperatures, such as those used for extrusion coating which range from about 270° C. to about 340° C. At these higher processing temperatures some acidifying components liberate water which creates voids and bubbles in the films and articles manufactured. These voids and bubbles give the final films and articles an unpleasant appearance, and if the voids and bubbles are large enough, may reduce the films ability to scavenge oxygen. In order to obtain the improved oxygen-scavenging benefits of the acidifying component without compromising the quality of the film, dehydrated derivatives of certain acidifying components are used. Conveniently, dehydration may be accomplished by calcination in a furnace or kiln. The calcining process drives off the water from the acidifying component prior to its compounding and use in a high temperature fabrication operation. In this manner, the water is not driven off during the extrusion film coating process and the formation of voids and bubbles is prevented. Preferably, no more than 500 ppm of water remain in the oxygen-scavenging resin composition, and more preferably no more than 100 ppm.

In addition, the water may be driven off during the initial melt compounding of the oxygen-scavenging composition to form oxygen-scavenging resin pellets. These pellets are then subsequently processed or fabricated into the final article or film. Since the water is driven off during the initial melt-compounding, and not during fabrication, formation of voids and bubbles in the film or article is avoided.

For such high temperature extrusion coating process, preferred acidifying components are those that are thermally stable above 270° C. Examples include calcined products of: monocalcium phosphate, monomagnesium phosphate, magnesium sulfate, disodium dihydrogen pyrophosphate, also known as sodium acid pyrophosphate, sodium metaphosphate, sodium trimetaphosphate, sodium phosphate monobasic, sodium hexametaphosphate, aluminum sulfate, potassium phosphate monobasic, potassium acid pyrophosphate, aluminum potassium sulfate and combinations thereof. Sodium metaphosphate, sodium trimetaphosphate, and sodium hexametaphosphate are all intermediates of the sodium acid pyrophosphate calcining process. Extrusion coated packaging films and articles made from oxygen-scavenging resins containing a metal compound, an electrolyte and a calcined acidifying component, are free of voids and bubbles and exhibit improved oxygen absorption rates and capacity compared to those scavenging resins that contain no acidifying component. The thermal decomposition temperature of calcined monocalcium phosphate is 375° C. and calcined sodium acid pyrophosphate or sodium hexametaphosphate is 550° C.

Components of the invented oxygen-scavenging compositions are present in proportions effective to provide oxygen-scavenging effects. Preferably, at least one part by weight electrolyte component plus acidifying component is present per hundred parts by weight oxidizable metal component, with the weight ratio of electrolyte component to acidifying component ranging from about 99:1 to about 1:99. More preferably, at least about 10 parts electrolyte plus acidifying components are present per 100 parts oxidizable metal component to promote efficient usage of the latter for reaction with oxygen. There is no upper limit on the amount of electrolyte plus acidifier relative to metal from this standpoint although little or no gain in oxidation efficiency is seen above about 200 parts per 100 parts metal and economic and processing considerations may favor lower levels. In order to achieve an advantageous combination of oxidation efficiency, low cost and ease of processing and handling, about 30 to about 150 parts electrolyte plus acidifying component per 100 parts metal component are most preferred.

An optional water-absorbing binder can also be included in the invented compositions, if desired, to further enhance oxidation efficiency of the oxidizable metal. The binder can serve to provide additional moisture which enhances oxidation of the metal in the presence of the promoter compounds. The binder is dry when it is added to the oxygen-scavenging composition and absorbs moisture from the products packages in the final article or during retort. Water-absorbing binders suitable for use generally include materials that absorb at least about 5 percent of their own weight in water and are chemically inert. Examples of suitable binders include diatomaceous earth, boehmite, kaolin clay, bentonite clay, acid clay, activated clay, zeolite, molecular sieves, talc, calcined vermiculite, activated carbon, graphite, carbon black, and the like. It is also contemplated to utilize organic binders, examples including various water absorbent polymers as disclosed in Koyama et al., European Patent Application No. 428,736. Mixtures of such binders also can be employed. Preferred binders are bentonite clay, kaolin clay, and silica gel. When used, the water-absorbent binder preferably is used in an amount of at least about five parts by weight per hundred parts by weight of the oxidizable metal, electrolyte and acidifying components. More preferably, about 15 to about 100 parts of binder per hundred parts metal are present as lesser amounts may have little beneficial effect while greater amounts may hinder processing and handling of the overall compositions without offsetting gain in oxygen-scavenging performance. When a binder component is used in compositions compounded into plastics, the binder most preferably is present in an amount ranging from about 10 to about 50 parts per hundred parts metal to enhance oxidation efficiency at loading levels low enough to ensure ease of processing.

A particularly preferred oxygen-scavenging composition according to the invention comprises iron powder as the metal component, sodium chloride as the electrolyte and sodium acid pyrophosphate or monocalcium phosphate as the acidifying component, with about 10 to about 150 parts by weight sodium chloride plus sodium acid pyrophosphate or monocalcium phosphate being present per hundred parts by weight iron and the weight ratio of sodium chloride to sodium acid pyrophosphate or monocalcium phosphate being about 10:90 to about 90:10. Optionally, up to about 100 parts by weight water absorbing binder per hundred parts by weight of the other components also are present. Most preferably, the composition comprises iron powder, about 5 to about 100 parts sodium chloride and about 5 to about 70 parts sodium acid pyrophosphate per hundred parts iron and up to about 50 parts binder per hundred parts of the other components.

According to another aspect of this invention, there is provided an oxygen scavenger resin composition comprising at least one plastic resin and the abovedescribed oxygen-scavenging composition, with or without the water-absorbent binder component. The selection of the acidifying component will depend on the melt fabrication temperature of the plastic resin. Sodium acid pyrophosphate and monocalcium phosphate are thermally stable above 200° C., while calcined products of sodium acid pyrophosphate and calcined products of monocalcium phosphate are stable above 270° C.

Any suitable polymeric resin into which an effective amount of the oxygen-scavenging composition of this invention can be incorporated and that can be formed into a laminar configuration, such as film, sheet or a wall structure, can be used as the plastic resin in the compositions according to this aspect of the invention. Thermoplastic and thermoset resins can be used. Examples of thermoplastic polymers include polyamides, such as nylon 6, nylon 66 and nylon 612, linear polyesters, such as polyethylene terephthalate, polybutylene terephthalate and polyethylene naphthalate, branched polyesters, polystyrenes, styrene block copolymers such as those comprising styrene blocks and rubber blocks comprising ethylene, propylene, isoprene, butadiene, butylene or isobutylene polymer blocks or combinations thereof, polycarbonate, polymers of unsubstituted, substituted or functionalized olefins such as polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylenes (including, high, low, and linear low density polyethylenes and so-called metallocene polyethylenes), polypropylene, ethylene-propylene copolymers, poly(1-hexene), poly(4-methyl-1-pentene), poly(1-butene), poly(3-methyl-1-butene), poly(3-phenyl-1-propene) and poly (vinylcyclohexane). Homopolymers and copolymers are suitable as are polymer blends containing one or more of such materials. Thermosetting resins, such as epoxies, oleoresins, unsaturated polyester resins and phenolics also are suitable.

Preferred polymers are thermoplastic resins having oxygen permeation coefficients greater than about $2 \times 10^{-12}$ cc-cm/cm$^2$-sec-cm Hg as measured at a temperature of 20° C. and a relative humidity of 0% because such resins are relatively inexpensive, easily formed into packaging structures and, when used with the invented oxygen-scavenging compositions, can provide a high degree of active barrier protection to oxygen-sensitive products. Examples of these include polyethylene terephthalate and polyalpha-olefin resins such as high, low and linear low density polyethylene and polypropylene. Even relatively low levels of oxygen-scavenging composition, e.g., about 5 to about 15 parts per hundred parts resin, can provide a high degree of oxygen barrier protection to such resins. Among these preferred resins, permeability to oxygen increases in the order polyethylene terephthalate ("PET"), polypropylene ("PP"), high density polyethylene ("HDPE"), linear low density polyethylene ("LLDPE"), and low density polyethylene ("LDPE"), other things being equal. Accordingly, for such polymeric resins, oxygen scavenger loadings for achieving a given level of oxygen barrier effectiveness increase in like order, other things being equal.

According to a preferred embodiment of the invention, the thermoplastic resin comprises a soft resin with a flexible molecular chain. Such soft resins with the flexibility of rubber, such as polyalpha-olefins polymerized using metallocene catalysts (also known as plastomers) and thermoplastic elastomers, show unexpectedly superior oxygen absorption efficiency when compared to more rigid thermoplastic resins, all other conditions being equal. It is believed that the flexible molecular structure of soft resins facilitates the migration and intimate contact of the oxygen-scavenging components. This close contact promotes the oxidation reaction which leads to unexpectedly higher oxygen absorption efficiency (cc $O_2$/gm Fe) compared to harder and more rigid polymeric resins. The softness and flexibility of a resin can be determined by examining several properties including its 1% secant modulus (ASTM D 882-3) and its Shore Hardness (ASTM D 2240). Measuring either of the properties will provide a good indication of whether a resin will exhibit improved oxygen efficiency. Typically, improved oxygen absorption efficiency can be found in resins with a 1% secant modulus less than 25,000 p.s.i. and/or a Shore D Hardness less than 45. Preferred resins have a 1% secant modulus less than about 20,000 p.s.i. and/or a Shore D Hardness less than about 42. Sample carrier resins, their secant modulus and Shore Hardness are listed in Example 11, Table II.

Preferred, soft, flexible resins according to this embodiment of the invention are polyalpha-olefins polymerized using metallocene catalysts such as metallocene polyethylenes ("mPE") and metallocene polypropylenes ("mPP"). mPEs are copolymers of ethylene with at least one higher alpha-olefin of about 4–8 carbons such as butene, hexene and octene with comonomer levels from about 1–25%. mPEs also have a narrow molecular weight distribution—$(MW)_w/(MW)_n$—of about 2 to 5. Specific examples include Dow Affinity resins, Dow/Dupont Engage resins and Exxon Exact resins. These mPEs are described in the literature as linear, short chain branched polymer chains with high comonomer content, narrow comonomer distribution and uniform, narrow molecular weight distribution. The 1% secant modulus range for mPEs is about 2,500 to about 9,000 p.s.i., and the Shore D Hardness from about 29 to about 41. By contrast, the conventional multi-site Zieglar-Natta-catalyzed polyolefins (e.g. "LLDPE") are linear with broad comonomer distribution and broader molecular weight distribution of about 6 to 8, and traditional radical-initiated polyolefins (e.g. "LDPE") contain no comonomers, are highly branched with long and short chain branches, and have a broad molecular weight distribution of about 10 to 14. Conventional LDPE resins have a 1% secant modulus from about 25,000 p.s.i. to about 38,000 p.s.i. and a Shore D Hardness from about 45–55. LLDPE resins have a 1% secant modulus from about 30,000 to about 75,000 and a Shore D Hardness from about 45–55. Polypropylene has a 1% secant modulus range from about 160,000 to about 230,000 p.s.i. and a Shore D Hardness from about 65 to about 85. As carrier resins for the oxygen-scavenging component, mPEs have shown superior oxygen absorption rates and capacities relative to oxygen scavenger carrier resins comprising conventional LDPE, LLDPE and PP.

Another group of preferred, soft, flexible resins that show improved oxygen absorption efficiency are styrene block copolymers such as those comprising styrene blocks and rubber blocks of ethylene, propylene, isoprene, butadiene, butylene or isobutylene or combinations thereof. ("styrene-rubber block copolymers"). Styrene-rubber block copolymers consist of block segments of polymerized styrene monomer units and rubber monomer units such as butadiene, isoprene and ethylene-butylene. The styrene/rubber ratio in the copolymers can vary widely, but typically from 15–40 parts styrene blocks to 60–85 parts rubber blocks. The rubber units give these block copolymers their flexibility and elasticity. The 1% secant modulus of these block copolymers is from about 150 to about 2000 p.s.i. Their Shore D Hardness is from about 5 to about 15. As suggested above, this flexibility and softness facilitates migration and intimate contact between the oxygen-scavenging components—i.e., the oxidizable metal component, electrolyte component and solid, non-electrolytic, acidifying component—which promotes the efficient oxidation of the metal component.

A specific example of such block copolymers are Shell's G and D series Kraton® rubber polymers which are soft, flexible, elastic, thermoplastics. Shell's G series Kraton® consists of styrene-ethylene-butylene-styrene block copolymers ("SEBS"), and the D series consists of styrene-butadiene-styrene block copolymer ("SBS"). Another example is a styrene-isobutylene-styrene block copolymer ("SIBS").

In addition to metallocene-catalyzed polyolefins and styrene-rubber block copolymers, soft, flexible resins such as very low density polyethylene ("VLDPE"), ultra low density polyethylene ("ULDPE"), elastomeric forms of polypropylene such as elastomeric homopolypropylene ("EHPP"), and elastomeric copolymer polypropylene can also be used as the carrier resin to enhance oxygen absorption efficiency. ULDPE and VLDPE have a 1% secant modulus from about 18,000 to about 20,000 p.s.i. and a Shore D Hardness of about 42. Elastomeric forms of PP have a Shore D of about 20 and 1% secant modulus of about 1,800 p.s.i. Selection of the polymeric resin will depend upon several factors including the end-use packaging application, the level of oxygen absorption required, and whether or not the oxygen-scavenging composition in the polymeric resin will be further blended with the same or distinct resin.

In selecting a thermoplastic resin for use or compounding with the oxygen-scavenging composition of the invention, the presence of residual antioxidant compounds in the resin can be detrimental to oxygen absorption effectiveness. Phenol-type antioxidants and phosphite-type antioxidants are commonly used by polymer manufacturers for the purpose of enhancing thermal stability of resins and fabricated products obtained therefrom. Specific examples of these residual antioxidant compounds include materials such as butylated hydroxytoluene, tetrakis(methylene(3,5-di-t-butyl-4-hydroxyhydro-cinnamate)methane and triisooctyl phosphite. Such antioxidants are not to be confused with the oxygen scavenger components utilized in the present invention. Generally, oxygen absorption of the scavenger compositions of the present invention is improved as the level of residual antioxidant compounds is reduced. Thus, commercially available resins containing low levels of phenol-type or phosphite-type antioxidants, preferably less than about 1600 ppm, and most preferably less than about 800 ppm, by weight of the resin, are preferred (although not required) for use in the present invention. Examples are Dow Chemical Dowlex 2032 linear low density polyethylene (LLDPE); Union Carbide GRSN 7047 LLDPE; Goodyear PET "Traytuf" 9506; and Eastman PETG 6763. Commercially available mPEs such as Exxon Exact, Dow Affinity, and Dow/Dupont Engage have acceptable levels of antioxidants and styrene-rubber block copolymers such as Kraton® have suitable levels as well. Measurement of the amount of residual antioxidant can be performed using high pressure liquid chromatography.

When used in combination with resins, the oxidizable metal, electrolyte and acidifying components of the invented oxygen-scavenging compositions, and any optional water-absorbent binder that may be used, are used in particulate or powder form. Particle sizes of 50 mesh or smaller are preferred to facilitate melt-processing of oxygen scavenger thermoplastic resin formulations. For use with thermoset resins for formation of coatings, particle sizes smaller than the thickness of the final coating are employed. The oxygen scavenger can be used directly in powder or particulate form, or it can be processed, for example by melt compounding or compaction-sintering, into pellets to facilitate further handling and use.

Processing aids may also be used when the oxygen scavenging components are combined with resins. For example, flouropolymers such as Dynamar FX-9613 and FX-5920A available from Dyneon can be added to the melt compounding process to reduce the melt fracture of the polymer matrix and possibly reduce the die pressure. Preferably, 50 ppm–5000 ppm of flouropolymer may be added, more preferably 200 ppm–2000 ppm, and most preferably 500 ppm–1000 ppm of flouropolymer may be added to the oxygen-scavenging resin comprised of oxidizable metal, electrolyte, acidifying component, and the carrier resin of the present invention.

The mixture of oxidizable metal component, electrolyte component, acidifying component and optional water-absorbent binder can be added directly to a thermoplastic polymer compounding or melt-fabrication operation, such as in the extrusion section thereof, after which the molten mixture can be advanced directly to a film or sheet extrusion or coextrusion line to obtain monolayer or multilayer film or sheet in which the amount of oxygen-scavenging composition is determined by the proportions in which the composition and resin are combined in the resin feed section of the extrusion-fabrication line. Alternatively, the mixture of oxidizable metal component, electrolyte component, acidifying component and optional binder can be compounded into masterbatch concentrate pellets, which can be further let down into packaging resins for further processing into extruded film or sheet, or injection molded articles such as tubs, bottles, cups, trays and the like. Soft, flexible resins with a 1% Secant modulus less than 25,000 p.s.i. and a Shore D Hardness less than 45 are more preferred carrier resins for the concentrate pellets because they promote greater oxygen absorption efficiency when used in combination with more rigid packaging resins. Soft, flexible resins with a 1% Secant modulus less than about 20,000 p.s.i. and a Shore D Hardness less than about 42 are particularly preferred. Again, examples of such resins include mPEs, styrene-rubber block copolymers, VLDPE, ULDPE, and elastomeric forms of polypropylene. Particularly preferred carrier resins are styrene-butadiene block copolymers and metallocene polyethylenes.

The degree of mixing of oxidizable metal, electrolyte and acidifying components and, if used, optional binder component has been found to affect oxygen absorption performance of the oxygen-scavenging compositions, with better mixing leading to better performance. Mixing effects are most noticeable at low electrolyte plus acidifying components to oxidizable metal component ratios and at very low and very high acidifying component to electrolyte component ratios. Below about 10 parts by weight electrolyte plus acidifying components per hundred parts by weight metal component, or when the weight ratio of either the electrolyte or acidifying component to the other is less than about 10:90, the oxygen scavenger components are preferably mixed by aqueous slurry mixing followed by oven drying and grinding into fine particles. Below these ratios, mixing by techniques suitable at higher ratios, such as by high-intensity powder mixing, as in a Henschel mixer or a Waring powder blender, or by lower intensity mixing techniques, as in a container on a roller or tumbler, may lead to variability in oxygen uptake, particularly when the compositions are incorporated into thermoplastic resins and used in melt processing operations. Other things being equal, it has been found that oxygen-scavenging compositions prepared by slurry mixing have the highest oxygen absorption efficiency or performance, followed in order by compositions prepared using high intensity solids mixers and roller/tumbler mixing techniques. However, when mixing a composition containing a calcined acidifying component for use in a high temperature application, non-slurry mixing techniques are preferred.

Other factors that may affect oxygen absorption performance of the invented oxygen-scavenging compositions include surface area of articles incorporating the compositions, with greater surface area normally providing better oxygen absorption performance. The amount of residual moisture in the water-absorbent binder, if used, also can affect performance with more moisture in the binder leading to better oxygen absorption performance. However, there are practical limits on the amount of moisture that should be present in the binder because too much can cause premature activation of the oxygen scavenger composition as well as processing difficulties. The moisture can also cause poor aesthetics, such as bubbles and voids, in fabricated products. Especially those fabricated at high temperatures.

When incorporated into thermoplastic resins and used for fabrication of articles by melt processing techniques, the nature of the resin also can have a significant effect. Thus when the invented oxygen-scavenging compositions are used with amorphous and/or oxygen permeable polymers such as polyolefins or amorphous polyethylene terephthalate, higher oxygen absorption is seen than when the compositions are used with crystalline and/or oxygen barrier polymers such as crystalline polyethylene terephthalate and EVOH. Superior oxygen absorption efficiency is observed when the invented compositions are used with soft, flexible resins such as metallocene catalyzed polyolefins and styrene-rubber block copolymers.

When used with thermoplastic resins, the oxygen-scavenging compositions can be incorporated directly into the resin in amounts effective to provide the desired level of oxygen-scavenging ability. When so-used, preferred oxygen scavenger levels will vary depending on the choice of resin, configuration of the article to be fabricated from the resin and oxygen-scavenging capability needed in the article. Use of resins with low inherent viscosity, e.g., low molecular weight resins, normally permits higher loadings of scavenger composition without loss of processability. Conversely, lesser amounts of oxygen scavenger may facilitate use of polymeric materials having higher viscosities. Preferably, at least about 2 parts by weight oxygen-scavenging composition are used per 100 parts by weight resin. Loading levels above about 200 parts per hundred parts resin generally do not lead to gains in oxygen absorption and may interfere with processing and adversely affect other product properties. More preferably, loading levels of about 5 to about 150 parts per hundred are used to obtain good scavenging performance while maintaining processability. Loading levels of about 5 to about 15 parts per hundred are particularly preferred for fabrication of thin films and sheets. For films and sheets made directly from resin concentrates, loading levels of about 5 to about 100 parts oxygen-scavenging composition per hundred parts resin are preferred, 5 to 50 parts most preferred.

Preferred oxygen scavenger resin compositions for fabrication of packaging articles comprise at least one thermoplastic resin and about 5 to about 150 parts by weight oxygen-scavenging composition per hundred parts by weight resin, more preferably 5 to about 50 parts, with the oxygen-scavenging composition comprising iron powder, sodium chloride and sodium acid pyrophosphate. About 10 to about 200 parts by weight sodium chloride and sodium acid pyrophosphate per hundred parts by weight iron are present in the scavenging composition, more preferably about 30 to about 130 parts and the weight ratio of sodium chloride to sodium acid pyrophosphate is about 10:90 to about 90:10. Up to about 50 parts by weight water-absorbent binder per hundred parts by weight of resin and oxygen scavenger also can be included. Especially preferred compositions of this type comprise polypropylene, high, low or linear low density polyethylene or polyethylene terephthalate as the resin, about 5 to about 30 parts by weight oxygen scavenger per hundred parts by weight resin, about 5 to about 100 parts by weight sodium chloride and about 5 to about 70 parts by weight sodium acid pyrophosphate per hundred parts by weight iron and up to about 50 parts by weight binder per hundred parts by weight iron plus sodium chloride plus sodium acid pyrophosphate.

Another preferred composition for packaging articles comprises a soft, flexible resin such as mPE or a styrene-rubber block copolymer, and about 5 to about 150 parts by weight oxygen scavenger per hundred parts by weight resin, with the oxygen-scavenging composition comprising iron powder, sodium chloride and sodium acid pyrophosphate or monocalcium phosphate. The oxygen scavenger is about 5 to about 150 parts by weight sodium chloride and about 5 to about 100 parts by weight sodium acid pyrophosphate or monocalcium phosphate per hundred parts by weight iron.

When packaging articles are manufactured using a high temperature fabrication process, use of calcined sodium acid pyrophosphate or calcined monocalcium phosphate as acidifying components are preferred to prevent the formation of bubbles and voids in the fabricated article.

While the oxygen-scavenging composition and resin can be used in a non-concentrated form for direct fabrication of scavenging sheets or films (i.e., without further resin dilution), it also is beneficial to use the oxygen-scavenging composition and resin in the form of a concentrate. When so-used, the ability to produce a concentrate with low materials cost weighs in favor of relatively high loadings of scavenger that will still permit successful melt compounding, such as by extrusion pelletization. Thus concentrate compositions according to the invention preferably contain at least about 10 parts by weight oxygen-scavenging composition per hundred parts by weight resin and more preferably about 30 to about 150 parts per hundred. Suitable resins for such oxygen-scavenging concentrate compositions include any of the thermoplastic polymer resins described herein. Low melt viscosity resins facilitate use of high scavenger loadings and typically are used in small enough amounts in melt fabrication of finished articles that the typically lower molecular weight of the concentrate resin does not adversely affect final product properties. Preferred carrier resins are polypropylene, high density, low density and linear low density polyethylenes, and polyethylene terephthalate. Preferred among those are polypropylenes having melt flow rates (ASTM D1238) of about 1 to about 40 g/10 min, polyethylenes having melt indices (ASTM D1238) of about 1 to about 20 g/10 min and polyethylene terephthalates having inherent viscosities (ASTM D2857) of about 0.6 to about 1 in phenol/trichloroethane.

A most preferred carrier resin for the concentrate compositions are the soft, flexible resins as indicated by a Shore D Hardness less than 45 and/or a secant modulus less than 25,000 p.s.i. Particularly preferred are those resins with a 1% Secant modulus less than about 20,000 p.s.i. and a Shore D Hardness less than about 42. These concentrate resins preferably contain about 30 to about 150 parts by weight oxygen-scavenging component per hundred parts by weight resin and most preferably about 75 to about 125 parts by weight oxygen-scavenging composition per 100 parts by weight resin. The oxygen-scavenging composition is preferably about 25 to 125 parts by weight sodium chloride and about 25 to 75 parts by weight acidifying component selected from sodium acid pyrophosphate, monocalcium phosphate, calcined sodium acid pyrophosphate or calcined monocalcium phosphate per 100 parts by weight iron. For fabrication of thin films from these concentrates, loading levels of about 5–150 parts oxygen-scavenging composition to 100 parts resin is preferred, and about 10–100 parts oxygen-scavenging composition to hundred parts resin is more preferred, and 10–50 parts oxygen-scavenging composition to hundred parts resin is most preferred. Concentrates and films produced in accordance with the above, exhibit superior oxygen absorption capabilities.

When concentrates are used to fabricate oxygen-scavenging films and packaging articles, such concentrates can be used alone or in combination with a thermoplastic resin that is either the same or distinct from the carrier resin. Thus, the concentrate can be comprised of a soft flexible resin and the film resin selected from polypropylene, polyethylene, polyethylene terephthalate or any other suitable resin depending on the final packaging structure. Likewise, both the carrier resin and the film or packaging resin can be comprised of the same or distinct soft, flexible resin or the same or distinct more rigid thermoplastic resin. Preferably, at least the carrier resin is of the soft, flexible type to achieve superior oxygen absorption capabilities.

It also is contemplated to utilize various components of the oxygen-scavenging composition or combinations of such components to form two or more concentrates that can be combined with a thermoplastic resin and fabricated into an oxygen-scavenging product. An advantage of using two or more concentrates is that the electrolyte and acidifying components can be isolated from the oxidizable metal until preparation of finished articles, thereby preserving full or essentially full oxygen-scavenging capability until actual use and permitting lower scavenger loadings than would otherwise be required. In addition, separate concentrates permit more facile preparation of differing concentrations of the electrolyte and acidifying components and/or water absorbent binder with the oxidizable metal and also enable fabricators to conveniently formulate a wide range of melt-processible resin compositions in which oxygen-scavenging ability can be tailored to specific end use requirements. Preferred components or combinations of components for use in separate concentrates are (1) acidifying component; (2) combinations of oxidizable metal component with water absorbing binder component; and (3) combinations of electrolyte and acidifying components.

A particularly preferred component concentrate is a composition comprising an acidifying component such as sodium acid pyrophosphate, monocalcium phosphate, calcined sodium acid pyrophosphate or calcined monocalcium phosphate and a thermoplastic resin. Such a concentrate can be added in desired amounts in melt fabrication operations utilizing thermoplastic resin that already contains, or to which will be added, other scavenging components, such as an oxidizable metal or combination thereof with an electrolyte, to provide enhanced oxygen-scavenging capability. Especially preferred are concentrates containing about 10 to about 150 parts by weight sodium acid pyrophosphate, calcined sodium acid pyrophosphate, or calcined monocalcium phosphate per hundred parts by weight resin. The concentrate resin may be selected from any number of resins such as with polypropylene, polyethylene and polyethylene terephthalate, with soft flexible resins being the most preferred with mPEs and styrene- rubber block copolymers giving the best results.

Polymeric resins that can be used for incorporating the oxygen-scavenging compositions into internal coatings of cans via spray coating and the like are typically thermoset resins such as epoxy, oleoresin, unsaturated polyester resins or phenolic based materials.

This invention also provides articles of manufacture comprising at least one melt-fabricated layer incorporating the oxygen-scavenging compositions as described above. Because of the improved oxidation efficiency afforded by the invented oxygen-scavenging compositions, the scavenger-containing layer can contain relatively low levels of the scavenger. The articles of the present invention are well suited for use in flexible or rigid packaging structures. In the case of rigid sheet packaging according to the invention, the thickness of the oxygen-scavenging layer is preferably not greater than about 100 mils, and is most preferably in the range of about 10 to about 50 mils. In the case of flexible film packaging according to the invention, the thickness of the oxygen scavenger layer is preferably not greater than about 10 mils and, most preferably, about 0.5 to about 8 mils. As used herein, the term "mils" is used for its common meaning, i.e., one-thousandth of an inch. Packaging structures and fabricated articles according to the invention can be in the form of films or sheets, both rigid and flexible, as well as container or vessel walls and liners as in trays, cups, bowls, bottles, bags, pouches, boxes, films, cap liners, can coatings and other packaging constructions. Both monolayer and multilayer structures are contemplated.

The oxygen-scavenging composition and resin of the present invention afford active-barrier properties in articles fabricated therefrom and can be melt processed by any suitable fabrication technique into packaging walls and articles having excellent oxygen barrier properties without the need to include layers of costly gas barrier films such as those based on EVOH, PVDC, metallized polyolefin or polyester, aluminum foil, silica coated polyolefin and polyester, etc. The oxygen scavenger articles of the present invention also provide the additional benefit of improved recyclability. Scrap or reclaim from the oxygen-scavenging resin can be easily recycled back into plastic products without adverse effects. In contrast, recycle of EVOH or PVDC gas barrier films may cause deterioration in product quality due to polymer phase separation and gelation occurring between the gas barrier resin and other resins making up the product. Nevertheless, it also is contemplated to provide articles, particularly for packaging applications, with both active and passive oxygen barrier properties through use of one or more passive gas barrier layers in articles containing one or more active barrier layers according to the invention. Thus, for some applications, such as packaging for food for institutional use and others calling for long shelf-life, an oxygen-scavenging layer according to the present invention can be used in conjunction with a passive gas barrier layer or film such as those based on EVOH, PVDC, metallized polyolefins or aluminum foil.

The present invention is also directed to a packaging wall containing at least one layer comprising the oxygen-scavenging composition and resin described above. It should be understood that any packaging article or structure intended to completely enclose a product will be deemed to have a "packaging wall," as that term is used herein, if the packaging article comprises a wall, or portion thereof, that is, or is intended to be, interposed between a packaged product and the atmosphere outside of the package and such wall or portion thereof comprises at least one layer incorporating the oxygen-scavenging composition of the present invention. Thus, bowls, bags, liners, trays, cups, cartons, pouches, boxes, bottles and other vessels or containers which are intended to be sealed after being filled with a given product are covered by the term "packaging wall" if the oxygen-scavenging composition of the invention is present in any wall of such vessel (or portion of such wall) which is interposed between the packaged product and the outside environment when the vessel is closed or sealed. One example is where the oxygen-scavenging composition of the invention is fabricated into, or between, one or more continuous thermoplastic layers enclosing or substantially enclosing a product. Another example of a packaging wall according to the invention is a monolayer or multilayer film or sheet containing the present oxygen-scavenging composition used as a cap liner in a beverage bottle (i.e., for beer, wine, fruit juices, etc.) or as a wrapping material.

An attractive active-barrier layer is generally understood as one in which the kinetics of the oxidation reaction are fast enough, and the layer is thick enough, that most of the oxygen permeating into the layer reacts without allowing a substantial amount of the oxygen to transmit through the layer. Moreover, it is important that this "steady state" condition exist for a period of time appropriate to end use requirements before the scavenger layer is spent. The present invention affords this steady state, plus excellent scavenger longevity, in economically attractive layer thicknesses, for example, less than about 100 mils in the case of sheets for rigid packaging, and less than about 10 mils in the case of flexible films. For rigid sheet packaging according to the present invention, an attractive scavenger layer can be provided in the range of about 10 to about 30 mils, while for flexible film packaging, layer thicknesses of about 0.5 to about 8 mils are attractive. Such layers can function efficiently with as little as about 2 to about 10 weight % oxygen scavenger composition based on weight of the scavenger layer.

In fabrication of packaging structures according to the invention, it is important to note that the oxygen-scavenging resin composition of the invention is substantially inactive with respect to chemical reaction with oxygen so long as the water activity of the composition is less than about 0.2–0.3. In contrast, the composition becomes active for scavenging oxygen when the water activity is at or above about 0.2–0.3. Water activity is such that, prior to use, the invented packaging articles can remain substantially inactive in relatively dry environments without special steps to maintain low moisture levels. However, once the packaging is placed into use, most products will have sufficient moisture to activate the scavenger composition incorporated in the walls of the packaging article. In the case of a hypothetical packaging article according to the invention having an intermediate oxygen-scavenging layer sandwiched between inner and outer layers, the scavenging layer of the structure, in which the oxygen-scavenging composition of the present invention is contained, will be active for chemical reaction with oxygen permeating into the scavenging layer if following equation is satisfied:

$$a = \frac{d_i(WVTR)_o a_o + d_o(WVTR)_i a_i}{d_i(WVTR)_o + d_o(WVTR)_i} \geq 0.2 - 0.3$$

where:
- $d_i$ is the thickness in mils of the inner layer;
- $d_o$ is the thickness in mils of the outer layer;
- $a_o$ is the water activity of the environment outside the packaging article (i.e., adjacent the outer layer);
- $a_i$ is the water activity of the environment inside the packaging article (i.e., adjacent the inner layer);
- a is the water activity of the scavenging layer;
- $(WVTR)_o$ is the water vapor transmission rate of the outer layer of the packaging wall in gm.mil/100 in. sq. day at 100° F. and 90% RH according to ASTM E96; and
- $(WVTR)_i$ is the water vapor transmission rate of the inner layer of the packaging wall in gm.mil/100 in. sq. day at 100° F. and 90% RH according to ASTM E96.

For monolayer packaging constructions in which a layer incorporating the oxygen-scavenging composition is the only layer of the packaging wall, the package will be active for oxygen absorption provided $a_o$ or $a_i$ is greater than or equal to about 0.2–0.3.

To prepare a packaging wall according to the invention, an oxygen-scavenging resin formulation is used or the oxygen-scavenging composition, or its components or concentrates thereof, is compounded into or otherwise combined with a suitable packaging resin whereupon the resulting resin formulation is fabricated into sheets, films or other shaped structures. Formulations or concentrates using soft, flexible resins as the carrier resin may be compounded or combined with any suitable packaging resin including but not limited to polypropylene, polyethylene, or polyethylene terephthalate. Extrusion, coextrusion, blow molding, injection molding, extrusion coating and any other sheet, film or general polymeric melt-fabrication technique can be used. Sheets and films obtained from the oxygen scavenger composition can be further processed, e.g. by coating or lamination, to form multilayered sheets or films, and then shaped, such as by thermoforming or other forming operations, into desired packaging walls in which at least one layer contains the oxygen scavenger. Such packaging walls can be subjected to further processing or shaping, if desired or necessary, to obtain a variety of active-barrier end-use packaging articles. The present invention reduces the cost of such barrier articles in comparison to conventional articles which afford barrier properties using passive barrier films.

As a preferred article of manufacture, the invention provides a packaging article comprising a wall, or combination of interconnected walls, in which the wall or combination of walls defines an enclosable product-receiving space, and wherein the wall or combination of walls comprises at least one wall section comprising an oxygen-scavenging layer comprising (i) a polymeric resin, preferably a thermoplastic resin or a thermoset resin, most preferably a thermoplastic resin selected from the group consisting of polyolefins, polystyrenes and polyesters, and most preferably soft, flexible resins with a 1% secant modulus less than 25,000 p.s.i. and Shore D Hardness less than 45; (ii) an oxidizable metal preferably comprising at least one member selected from the group consisting of iron, copper, aluminum, tin and zinc, and most preferably about 1 to about 100 parts iron per hundred parts by weight of the resin; (iii) an electrolyte component and (iv) a solid, non-electrolytic, acidifying component which in the presence of water has a pH of less than 7, with about 5 to about 150 parts by weight of electrolyte and acidifying components per hundred parts by weight iron preferably being present and the weight ratio of the acidifying component to electrolyte component preferably being about 5/95 to about 95/5; and, optionally, a water-absorbent binder. In such articles, sodium chloride is the most preferred electrolyte component and sodium acid pyrophosphate is most preferred as the acidifying component, with the weight ratio of sodium acid pyrophosphate to sodium chloride most preferably ranging from about 10/90 to about 90/10. For articles made by high temperature extrusion coating process, calcined sodium acid pyrophosphate or calcined monocalcium phosphate are the most preferred acidifying component.

A particularly attractive packaging construction according to the invention is a packaging wall comprising a plurality of thermoplastic layers adhered to one another in bonded laminar contact wherein at least one oxygen-scavenging layer is adhered to one or more other layers which may or may not include an oxygen-scavenging composition. It is particularly preferred, although not required, that the thermoplastic resin constituting the major component of each of the layers of the packaging wall be the same, so as to achieve a "pseudo-monolayer". Such a construction is easily recyclable.

An example of a packaging article using the packaging wall described above is a two-layer or three-layer dual ovenable tray made of crystalline polyethylene terephthalate ("C-PET") suitable for packaging pre-cooked single-serving meals. In a three-layer construction, an oxygen-scavenging layer of about 10 to 20 mils thickness is sandwiched between two non-scavenging C-PET layers of 3 to 10 mils thickness. The resulting tray is considered a "pseudo-monolayer" because, for practical purposes of recycling, the tray contains a single thermoplastic resin, i.e., C-PET. Scrap from this pseudo-monolayer tray can be easily recycled because the scavenger in the center layer does not detract from recyclability. In the C-PET tray, the outer, non-scavenging layer provides additional protection against oxygen transmission by slowing down the oxygen so that it reaches the center layer at a sufficiently slow rate that most of the ingressing oxygen can be absorbed by the center layer without permeating through it. The optional inner non-scavenging layer acts as an additional barrier to oxygen, but at the same time is permeable enough that oxygen inside the tray may pass into the central scavenging layer. It is not necessary to use a three layer construction. For example, in the above construction, the inner C-PET layer can be eliminated. A tray formed from a single oxygen-scavenging layer is also an attractive construction.

The pseudo-monolayer concept can be used with a wide range of polymeric packaging materials to achieve the same recycling benefit observed in the case of the pseudo-monolayer C-PET tray. For example, a package fabricated from polypropylene or polyethylene can be prepared from a multilayer packaging wall (e.g., film) containing the oxygen-scavenging composition of the present invention. In a two-layer construction the scavenger layer can be an interior layer with a non-scavenging layer of polymer on the outside to provide additional barrier properties. A sandwich construction is also possible in which a layer of scavenger-containing resin, such as polyethylene, is sandwiched between two layers of non-scavenging polyethylene. Alternatively, polypropylene, polystyrene or another suitable resin can be used for all of the layers.

Another example of a packaging article according to the invention is a film or packaging wall fabricated from low density polyethylene, polypropylene, PET or any other suitable resin and an oxygen-scavenging concentrate of a soft, flexible resin such as mPE or styrene-rubber block copolymers. For example, oxygen-scavenging concentrate pellets comprised of mPE can be melt-blended with LDPE resin to form a film of LDPE with regions of mPE which contain the oxygen-scavenging composition. Alternatively, oxygen-scavenging concentrate pellets comprised of styrene-butadiene block copolymer can be melt-blended with PET for form a package wall of PET with regions of styrene-butadiene block copolymer which contain the oxygen-scavenging composition. In this manner, the film or package wall can be composed of whatever resin is required for the particular packaging application without sacrificing the superior oxygen absorption capabilities of the soft flexible resins.

Various modes of recycle may be used in the fabrication of packaging sheets and films according to the invention. For example, in the case of manufacturing a multilayer sheet or film having a scavenging and non-scavenging layer, reclaim scrap from the entire multilayer sheet can be recycled back into the oxygen-scavenging layer of the sheet or film. It is also possible to recycle the multilayer sheet back into all of the layers of the sheet.

Packaging walls and packaging articles according to the present invention may contain one or more layers which are foamed. Any suitable polymeric foaming technique, such as bead foaming or extrusion foaming, can be utilized. For example, a packaging article can be obtained in which a foamed resinous layer comprising, for example, foamed polystyrene, foamed polyester, foamed polypropylene, foamed polyethylene or mixtures thereof, can be adhered to a solid resinous layer containing the oxygen-scavenging composition of the present invention. Alternatively, the foamed layer may contain the oxygen-scavenging composition, or both the foamed and the non-foamed layer can contain the scavenging composition. Thicknesses of such foamed layers normally are dictated more by mechanical property requirements, e.g. rigidity and impact strength, of the foam layer than by oxygen-scavenging requirements.

Packaging constructions such as those described above can benefit from the ability to eliminate costly passive barrier films. Nevertheless, if extremely long shelf life or added oxygen protection is required or desired, a packaging wall according to the invention can be fabricated to include one or more layers of EVOH, nylon or PVDC, or even of metallized polyolefin, metallized polyester, or aluminum foil. Another type of passive layer which may be enhanced by an oxygen-scavenging resin layer according to the present invention is silica-coated polyester or silica-coated polyolefin. In cases where a multilayer packaging wall according to the invention contains layers of different polymeric compositions, it may be preferable to use adhesive layers such as those based on ethylene-vinyl acetate copolymer or maleated polyethylene or polypropylene, and if desired, the oxygen scavenger of the present invention can be incorporated in such adhesive layers. It is also possible to prepare the oxygen-scavenging composition of the present invention using a gas barrier resin such as EVOH, nylon or PVDC polymer in order to obtain a film having both active and passive barrier properties.

While the focus of one embodiment of the invention is upon the incorporation of the oxygen-scavenging composition directly into the wall of a container, the oxygen-scavenging compositions also can be used in packets, as a separate inclusion within a packaging article where the intent is only to absorb headspace oxygen.

A primary application for the oxygen-scavenging resin, packaging walls, and packaging articles of the invention is in the packaging of perishable foods. For example, packaging articles utilizing the invention can be used to package milk, yogurt, ice cream, cheese; stews and soups; meat products such as hot dogs, cold cuts, chicken, beef jerky; single-serving pre-cooked meals and side dishes; homemade pasta and spaghetti sauce; condiments such as barbecue sauce, ketchup, mustard, and mayonnaise; beverages such as fruit juice, wine, and beer; dried fruits and vegetables; breakfast cereals; baked goods such as bread, crackers, pastries, cookies, and muffins; snack foods such as candy, potato chips, cheese-filled snacks; peanut butter or peanut butter and jelly combinations, jams, and jellies; dried or fresh seasonings; and pet and animal foods; etc. The foregoing is not intended to be limiting with respect to the possible applications of the invention. Generally speaking, the invention can be used to enhance the barrier properties in packaging materials intended for any type of product which may degrade in the presence of oxygen.

Still other applications for the oxygen-scavenging compositions of this invention include the internal coating of metal cans, especially for oxygen-sensitive food items such as tomato-based materials, baby food and the like. Typically the oxygen-scavenging composition can be combined with polymeric resins such as thermosets of epoxy, oleoresin, unsaturated polyester resins or phenolic based materials and the material applied to the metal can by methods such as roller coating or spray coating.

The examples provided below are for purposes of illustration and are not intended to limit the scope of invention.

For purposes of the following examples, oxygen-scavenging performance was measured according to an Oxygen Absorption Test performed in a 500 ml glass container containing the oxygen-scavenging composition in the form of powder, concentrate pellet or film. Distilled water or an aqueous salt solution in an open vial was placed inside the glass container next to the samples to be tested in order to control the relative humidity in the container. The container was then sealed and stored at the test temperature. The residual oxygen concentration in the headspace of the container was measured initially and then periodically using a Servomex Series 1400 Oxygen Analyzer or MOCON Oxygen Analyzer. The amount of oxygen absorbed by the test sample was determined from the change in the oxygen concentration in the headspace of the glass container. The test container had a headspace volume of about 500 ml and contained atmospheric air so that about 100 ml of oxygen were available for reaction with the iron. Test samples having an iron content of about 0.5 gm Fe were tested. For the test system, iron oxidized from metal to FeO has a theoretical oxygen absorption level of 200 cc $O_2$/gm Fe and iron oxidized from metal to $Fe_2O_3$ has a theoretical oxygen absorption level of 300 cc $O_2$/gm Fe. In all of the examples, oxygen scavenger component percentages are in weight percents based on total weight of the compositions, whether film, powder or pellet, tested for oxygen absorption.

EXAMPLE 1

Various powder mixtures of iron powder (SCM Iron Powder A-131); sodium chloride (Morton pulverized salt, Extra Fine 200); bentonite clay (Whittaker, Clarke & Davis, WCD-670); anhydrous sodium acid pyrophosphate ("SAP"), $Na_2H_2P_2O_7$ (Sigma #7758-16-9); sodium pyrophosphate decahydrate ("SPH"), $Na_4P_2O_7 \cdot 10H_2O$ (Aldrich 22,136-8) and anhydrous sodium pyrophosphate ("SPA"), $Na_4P_2O_7$ (Aldrich 32,246-6) were prepared as described below. Upon water absorption, SAP has a pH of 4 and SPH and SPA each has a pH of 10. The bentonite clay had been dried separately overnight at 250° C. in a vacuum oven. The desired weights of ingredients were dry blended in a Waring blender and the blended ingredients were stored under a nitrogen atmosphere. Samples 1-1 and 1-2 and comparative samples Comp 1-A through Comp 1-I were tested for oxygen absorption at test conditions of 168 hr, a relative humidity of 100% and a temperature of 22° C. Results are tabulated below. This Example demonstrates that the oxygen-scavenging compositions of this invention employing iron, sodium chloride and SAP provide equivalent or better oxygen absorbing efficiency than compositions of iron and sodium chloride with or without clay. Comparative compositions with iron, sodium chloride and SPH or SPA exhibit considerably lower oxygen absorption values. Also, comparative compositions with iron and clay, SAP, SPH or SPA all exhibited very low values of oxygen absorption with no electrolyte compound, sodium chloride, present.

| Powder No. | Fe, % | NaCl, % | Additive | Additive, % | Clay, % T | cc $O_2$ gm Fe |
|---|---|---|---|---|---|---|
| 1-1 | 50 | 37.5 | SAP | 12.5 | 0 | 204 |
| 1-2 | 44.4 | 33.3 | SAP | 11.1 | 11.1 | 169 |
| Comp 1-A | 100 | 0 | — | 0 | 0 | 5 |
| Comp 1-B | 57.1 | 42.9 | — | 0 | 0 | 202 |
| Comp 1-C | 50 | 37.5 | — | 0 | 12.5 | 204 |
| Comp 1-D | 50 | 37.5 | SPH | 12.5 | 0 | 74 |
| Comp 1-E | 50 | 37.5 | SPA | 12.5 | 0 | 44 |
| Comp 1-F | 80 | 0 | — | 0 | 20 | 39 |
| Comp 1-G | 80 | 0 | SAP | 20 | 0 | 17 |
| Comp 1-H | 80 | 0 | SPH | 20 | 0 | 2 |
| Comp 1-I | 80 | 0 | SPA | 20 | 0 | 2 |

EXAMPLE 2

A dry-mix preparation of oxygen scavenger ingredients was carried out in the following manner: Iron powder (SCM Iron Powder A-131); sodium chloride 24(Morton pulverized salt, Extra Fine 200); bentonite clay (Whittaker, Clarke & Davis, WCD-670) and anhydrous sodium acid pyrophosphate (SAP), $Na_2H_2P_2O_7$ (Sigma #7758-16-9) were dry blended in a Waring blender at a weight ratio of Fe:NaCl:bentonite clay:$Na_2H_2P_2O_7$ of 4:3:1:2. The bentonite clay had been dried separately overnight at 250° C. in a vacuum oven. The blended oxygen scavenger ingredients were stored under nitrogen. A concentrate of oxygen scavenger and polymer resin was prepared from a 50/50 weight ratio of linear low density polyethylene granules (GRSN 7047, Union Carbide) and the oxygen scavenger composition by tumble mixing in a bucket/bottle roller for ten minutes to obtain a homogeneous mixture. The resultant powder blend was fed directly to the hopper of a 19 mm conical corotating twin-screw extruder equipped with a strand die. The zone temperatures of the extruder barrel were set as follows: zone 1—215° C., zone 2—230° C., zone 3—230° C., and strand die—230° C. The extrudate was cooled with room-temperature water in a water bath and chopped into pellets with a pelletizer. The pellets were dried overnight at 100° C. in a vacuum oven and stored under nitrogen.

EXAMPLE 3

Low density polyethylene oxygen-scavenging films were prepared by extruding a mixture containing 80 parts by weight (pbw) low density polyethylene pellets (DOW 526 I, Dow Chemical) having a nominal oxygen permeation coefficient (OPC) of $1.5-2.1 \times 10^{-10}$ cc-cm/$cm^2$-sec-cm Hg, as measured at a temperature of 20° C. and a relative humidity of 0%, and 20 pbw of an oxygen-scavenging composition in the form of a concentrate prepared according to the procedure described in Example 2. The concentrates contained various amounts of iron, sodium chloride, bentonite clay and SAP as tabulated below with the weight ratio of sodium chloride to iron maintained at about 0.75:1. Films were prepared using a Haake Rheomex 245 single screw extruder (screw diameter-19 mm; L/D ratio-25:1). The zone temperatures of the extruder barrel were set as follows: zone 1—245° C., zone 2—250° C., zone 3—250° C. and die—230° C. Nominal thicknesses of the extruded films were 5 mils. Tabulated below is the amount of oxygen absorbed by each of the film samples as measured by the Oxygen Absorption Test described above at test conditions of 168 hr, a relative humidity of 100% and a temperature of 22° C. This example demonstrates that at a given weight ratio of sodium chloride to iron, addition of SAP significantly increases the oxygen absorption of the low density polyethylene oxygen-scavenging film.

| Film No. | Iron, % | NaCl, % | SAP, % | Clay, % | cc $O_2$ gm Fe |
|---|---|---|---|---|---|
| 3-1 | 4.00 | 3.00 | 2.00 | 1.00 | 92 |
| 3-2 | 4.44 | 3.33 | 1.11 | 1.11 | 50 |
| 3-3 | 4.71 | 3.53 | 0.59 | 1.18 | 51 |

EXAMPLE 4

Low density polyethylene oxygen-scavenging films were prepared by the same procedure as described in Example 3. The low density polyethylene films contained various amounts of iron, sodium chloride, bentonite clay and SAP as tabulated below with the weight ratio of SAP to iron held constant at a value of 0.5:1. Tabulated below is the amount of oxygen absorbed by each of the film samples as measured by the Oxygen Absorption Test described above at test conditions of 168 hr, a relative humidity of 100% and a temperature of 22° C. This example demonstrates that for low density polyethylene films containing iron, SAP and sodium chloride at a given weight ratio of SAP to iron, sodium chloride increased the oxygen-scavenging capacity of the low density polyethylene film and that as the amount of sodium chloride was increased, the oxygen-scavenging capacity of the film also increased.

| Film No. | Iron, % | NaCl, % | SAP, % | Clay, % | cc $O_2$ gm Fe |
|---|---|---|---|---|---|
| 4-1 | 5.56 | 0.28 | 2.78 | 1.39 | 33 |
| 4-2 | 5.33 | 0.67 | 2.67 | 1.33 | 56 |
| 4-3 | 5.13 | 1.03 | 2.56 | 1.28 | 60 |
| 4-4 | 4.00 | 3.00 | 2.00 | 1.00 | 92 |

EXAMPLE 5

Concentrates of the ingredient mixtures of Example 4 and polymer resin were prepared at a 50/50 weight ratio with linear low density polyethylene granules (GRSN 7047, Union Carbide) by tumble mixing the components in a bucket/bottle roller for ten minutes to obtain a homogeneous mixture. The resulting blends were formed into pellets by the procedure described in Example 2 and the concentrates were mixed with low density polyethylene pellets (Dow 526I, Dow Chemical) in a 1:4 weight ratio and these pellet blends formed into films for oxygen-scavenging testing. The films were tested at conditions of 168 hr, a relative humidity of 100% and a temperature of 22° C. The amount of thermoplastic polymer in the film was 90 weight % and the compositions of the remaining components are tabulated below together with the oxygen absorbed. This example demonstrates that the oxygen-scavenging composition of this invention comprising a thermoplastic resin, iron, sodium chloride and SAP provides equivalent or better oxygen absorbing efficiency than the thermoplastic resin, iron and sodium chloride, with or without clay. Comparative compositions with a thermoplastic resin, iron, sodium chloride and SPH or SPA all exhibit considerably lower oxygen absorption values. Also, comparative compositions with no electrolyte compound, sodium chloride, present all exhibited very low values of oxygen absorption. The water of hydration of the SPH led to processing difficulties during film extrusion.

| Powder No. | Fe, % | NaCl, % | Additive | Additive, % | Clay, T | cc $O_2$ gm Fe |
|---|---|---|---|---|---|---|
| 5-1 | 5.00 | 3.75 | SAP | 1.25 | 0 | 54 |
| 5-2 | 4.44 | 3.33 | SAP | 1.11 | 1.11 | 40 |
| Comp 5-A | 10.0 | 0 | — | 0 | 0 | 0.3 |
| Comp 5-B | 5.71 | 4.29 | — | 0 | 0 | 23 |
| Comp 5-C | 5.00 | 3.75 | — | 0 | 1.25 | 27 |
| Comp 5-D | 5.00 | 3.75 | SPH | 1.25 | 0 | 4 |
| Comp 5-E | 5.00 | 3.75 | SPA | 1.25 | 0 | 5 |
| Comp 5-F | 8.00 | 0 | — | 0 | 2.00 | 1 |
| Comp 5-G | 8.00 | 0 | SAP | 2.00 | 0 | 3 |
| Comp 5-H | 8.00 | 0 | SPH | 2.00 | 0 | 0.6 |
| Comp 5-I | 8.00 | 0 | SPA | 2.00 | 0 | 0.5 |

COMPARATIVE EXAMPLE A

Comparative, extruded low density polyethylene films were prepared by extruding a mixture containing 80 pbw low density polyethylene pellets (DOW 526 I, Dow Chemical) and 20 pbw of concentrates prepared according to Example 2 with various amounts of citric acid tripotassium salt ("CATP") as the additive. Citric acid tripotassium salt upon water absorption has a pH of 9. The extruded films were prepared according to the method described in Example 3 with the films having nominal thicknesses of 5 mils. The amounts of oxygen absorbed by the film samples as measured by the Oxygen Absorption Test described above at test conditions of 168 hr, a relative humidity of 100% and a temperature of 22° C. are given below. This comparative example demonstrates that citric acid tripotassium salt, having a pH greater than 7 upon water absorption, when added to NaCl is ineffective in enhancing oxygen-scavenging properties. Comparative films B-3 and B-4 with only SAP or sodium chloride as the additive exhibited oxygen absorption values of 3 and 26 cc $O_2$/gm Fe, respectively.

| Film No. | Iron, % | NaCl, % | CATP, % | SAP, % | Clay, % | cc $O_2$ gm Fe |
|---|---|---|---|---|---|---|
| B-1 | 4.44 | 3.33 | 1.11 | 0 | 1.11 | 0 |
| B-2 | 4.00 | 3.00 | 2.00 | 0 | 1.00 | 1 |
| B-3 | 5.71 | 0 | 0 | 2.86 | 1.43 | 3 |
| B-4 | 5.00 | 3.75 | 0 | 0 | 1.25 | 26 |

EXAMPLE 6

Low density polyethylene films were prepared by extruding a mixture containing 80 pbw low density polyethylene pellets (DOW 526 I, Dow Chemical) and 20 pbw of a concentrate prepared according to Example 2 with various amounts of nicotinic acid ("NIT") and sodium chloride. Nicotinic acid upon water absorption has a pH of 4–5. The extruded films were prepared according to the method described in Example 3 with the films having nominal thicknesses of 5 mils. The amount of oxygen absorbed by the film samples as measured by the Oxygen Absorption Test described above after 168 hr at a relative humidity of 100% and a temperature of 22° C. is tabulated below. This example demonstrates that nicotinic acid in combination with sodium chloride can improve oxygen-scavenging ability and that nicotinic acid without the electrolyte compound, sodium chloride, was not effective in increasing the oxygen-scavenging ability of the composition.

| Iron, % | NaCl, % | Clay, % | NIT, % | cc $O_2$ gm Fe |
|---|---|---|---|---|
| 4.00 | 3.00 | 1.00 | 2.00 | 49 |
| 5.71 | 0 | 1.43 | 2.86 | 4 |

EXAMPLE 7

Low density polyethylene oxygen-scavenging films were prepared by extruding a mixture containing 80 pbw low density polyethylene pellets (DOW 526 I, Dow Chemical) having a nominal OPC of $1.5-2.1\times10^{-10}$ cc-cm/cm$^2$-sec-cm Hg, as measured at a temperature of 20° C. and a relative humidity of 0%, and 20 pbw of concentrates containing various amounts of iron, sodium chloride, bentonite clay and SAP as tabulated below in the manner described according to Example 2. The film was prepared using a Haake Rheomex 245 single screw extruder (screw diameter-19 mm; L/D ratio-25:1). The zone temperatures of the extruder barrel were set as follows: zone 1—245° C., zone 2—250° C., zone 3—250° C. and die—230° C. The extrud films had nominal thicknesses of 5 mils. The amounts of oxygen absorbed by the film samples as measured by the Oxygen Absorption Test at test conditions of 168 hr, a relative humidity of 100% and a temperature of 22° C. are given below. This example demonstrates good oxygen absorption performance even at low levels of electrolyte plus acidifying components but that oxygen absorption was erratic at low electrolyte to acidifier ratios. The latter results are believed to have been caused by difficulties in effectively mixing the compositions with low levels of sodium chloride.

| Iron, % | NaCl, % | SAP, % | Clay, % | cc $O_2$ gm Fe |
|---|---|---|---|---|
| 5.6 | 0.3 | 2.8 | 1.4 | 55 |
| 6.5 | 0.3 | 1.6 | 1.6 | 69 |
| 7.1 | 0.4 | 0.7 | 1.8 | 50 |
| 7.4 | 0.4 | 0.4 | 1.9 | 44 |
| 7.6 | 0.4 | 0.2 | 1.9 | 49 |
| 5.7 | 0.06 | 2.8 | 1.4 | 45 |
| 6.6 | 0.07 | 1.7 | 1.7 | 19 |
| 7.4 | 0.07 | 0.7 | 1.8 | 29 |
| 7.6 | 0.08 | 0.4 | 1.9 | 15 |
| 7.8 | 0.08 | 0.2 | 2.0 | 46 |

EXAMPLE 8

Low density polyethylene oxygen-scavenging films were prepared by extruding a mixture containing 80 pbw low density polyethylene pellets (DOW 526 I, Dow Chemical) having a nominal OPC of $1.5–2.1\times10^{-10}$ cc-cm/cm²-sec-cm Hg, as measured at a temperature of 20° C. and a relative humidity of 0%, and 20 pbw of concentrates prepared according to Example 2 with iron, bentonite clay, citric acid and sodium chloride. Upon water absorption, citric acid has a pH of 1–2. The films were prepared according to the method described in Example 3 with the extruded films having nominal thicknesses of 5 mils. The amounts of oxygen absorbed by the film samples as measured by the Oxygen Absorption Test described above at test conditions of 168 hr, a relative humidity of 100% and a temperature of 22° C. are given below. This example demonstrates that with an acidifier compound of high acidity, the amount of oxygen absorbed was significantly increased.

| Additive | Iron, % | NaCl, % | Citric Acid, % | Clay, % | cc O₂ gm Fe |
|---|---|---|---|---|---|
| 0 | 5.00 | 3.75 | 0 | 1.25 | 26 |
| Citric Acid | 4.44 | 3.33 | 1.11 | 1.11 | 174 |
| Citric Acid | 4.00 | 3.00 | 2.00 | 1.00 | 197 |

EXAMPLE 9

Two separate concentrate preparations of various oxygen scavenger ingredients were carried out in the following manner: In one concentrate, iron powder (SCM iron Powder A-131); sodium chloride (Morton pulverized salt, Extra Fine 325); and bentonite clay (Whittaker, Clarke & Davis, WCD-670) were mixed in a high intensity Henschel mixer in a weight ratio of Fe:NaCl:bentonite clay of 4:3:1. The mixed ingredients were fed at a 50:50 by weight ratio with linear low density polyethylene powder (Dowlex 2032, Dow Chemical) to a Werner & Pfleiderer ZSK-40 twin-screw extruder to form concentrate pellets. A second concentrate of 25 weight percent of anhydrous sodium acid pyrophosphate, (Sigma #7758-16-9) with linear low density polyethylene powder was also prepared in a ZSK-40 twin-screw extruder. Films of polyethylene terephthalate ("PET") (nominal OPC of $1.8–2.4\times10^{-12}$ cc-cm/cm²-sec-cm Hg), polypropylene ("PP") (nominal OPC of $0.9–1.5\times10^{-10}$ cc-cm/cm²-sec-cm Hg), low density polyethylene ("LDPE") and linear low density polyethylene ("LLDPE") with various combinations of the above concentrates were extruded. In all of the films, the weight ratio of sodium chloride to iron was held constant at 0.75:1. The amounts of oxygen absorbed by these film samples as measured by the Oxygen Absorption Test at test conditions of 168 hr, a temperature of 22° C. and a relative humidity of 100% are tabulated below.

| Resin | Fe, % | NaCl, % | SAP, % | Clay, % | cc O₂ gm Fe |
|---|---|---|---|---|---|
| PET | 5.00 | 3.75 | 0 | 1.25 | 10 |
| PET | 4.00 | 3.00 | 1.00 | 1.00 | 14 |
| PET | 4.00 | 3.00 | 2.00 | 1.00 | 14 |
| PP | 5.00 | 3.75 | 0 | 1.25 | 28 |
| PP | 4.00 | 3.00 | 1.00 | 1.00 | 46 |
| PP | 4.00 | 3.00 | 2.00 | 1.00 | 50 |
| LLDPE | 5.00 | 3.75 | 0 | 1.25 | 39 |
| LLDPE | 4.00 | 3.00 | 1.00 | 1.00 | 99 |
| LLDPE | 4.00 | 3.00 | 2.00 | 1.00 | 98 |
| LDPE | 5.00 | 3.75 | 0 | 1.25 | 29 |
| LDPE | 4.00 | 3.00 | 1.00 | 1.00 | 41 |
| LDPE | 4.00 | 3.00 | 2.00 | 1.00 | 48 |

EXAMPLE 10

Two separate concentrates were prepared by the same procedure as in Example 9. One concentrate consisted of iron powder (SCM iron powder A-131); sodium chloride (Morton pulverized salt, Extra Fine 325); bentonite clay (Whittaker, Clarke & Davis, WCD-670); and linear low density polyethylene resin (Dowlex 2032, Dow Chemical) in a weight ratio of Fe:NaCl:bentonite clay:LLDPE of 4:3:1:8. The second concentrate consisted of sodium acid pyrophosphate (Sigman #7758-16-9) and linear low density polyethylene (Dowlex 2032, Dow Chemical) in a weight ratio of SAP:LLDPE of 1:3. Low density polyethylene oxygen-scavenging films were prepared by the same procedure as described in Example 3 using a Haake Rheomex 245 single screw extruder. The film processing temperatures varied from nominal 243° C. to nominal 260° C. to nominal 288° C. At nominal 243° C., the zone temperatures of the extruder barrel were set as follows: zone 1—241° C., zone 2—243° C., zone 3—243° C. and die—218° C. At nominal 260° C., the zone temperatures of the extruder barrel were set as follows: zone 1—254° C., zone 2—260° C., zone 3—260° C. and die—232° C. At nominal 288° C., the zone temperatures of the extruder barrel were set as follows: zone 1—282° C., zone 2—285° C., zone 3—288° C. and die—252° C. At the processing temperatures, the resulting films were found to contain voids believed to have been caused by decomposition of sodium acid pyrophosphate. Thermal gravimetric analysis of sodium acid pyrophosphate powder heated from room temperature to about 610° C. at a rate of about 10° C./minute indicated weight loss occurring from about 260 to 399° C., corresponding to loss of water from sodium acid pyrophosphate, thus suggesting decomposition thereof to NaPO₃. Based on these observations, it is believed that the higher processing temperatures used in this example led to decomposition of the sodium acid pyrophosphate that was originally used to sodium metaphosphate, sodium trimetaphosphate, sodium hexametaphosphate, each having a pH in the range of 4–6 in aqueous solution, or a combination thereof. The amounts of oxygen absorbed by these film samples as measured by the Oxygen Absorption Test at test conditions of 168 hr, a temperature of 22° C. and a relative humidity of 100% are tabulated below.

| Film No. | Nominal Film Processing Temp., ° C. | Iron, % | NaCl, % | SAP, % | Clay, % | cc O₂ gm Fe |
|---|---|---|---|---|---|---|
| 10-1 | 243 | 4.44 | 3.33 | 1.11 | 1.11 | 40 |
| 10-2 | 288 | 4.44 | 3.33 | 1.11 | 1.11 | 53 |
| 10-3 | 260 | 11.11 | 8.33 | 2.78 | 2.78 | 48 |
| 10-4 | 288 | 11.11 | 8.33 | 2.78 | 2.78 | 77 |

EXAMPLE 11

A dry-mix preparation of oxygen scavenger ingredients was carried out in the following manner: Iron powder (SCM A-131); sodium chloride (Morton EF325); and sodium acid pyrophosphate (Monsanto SAP-28) were mixed at 2/2/1 weight ratio of Fe/NaCl/SAP in an intensive mixing Henschel mixer. The mixing time was about 80 seconds. The powder mixture was compounded into nineteen separate resins as shown in the Table below at a 1/1 weight ratio on a twin-screw ZSK-30 extruder. The zone temperatures of the extruder barrel were set as follows: zone 1—140–200° C., zone 2—220–280° C., zone 3—230–270° C., zone 4—220–260° C., zone 5—220–260° C., zone 7—200–250° C. The melt temperature of the extrudate was in the range of 180–280° C. The extrudate was cooled and chopped into concentrate pellets of oxygen scavenger resin designated Concentrates I–XV and Concentrates A–D. The resulting concentrates were measured for oxygen-scavenging performance according to the Oxygen Absorption Test described above at 72 hr (3 day), 168 hr (7 days), and 672 hr (28 days). The results are tabulated below in Table I and the 1% Secant Modulus and Shore D Hardness are shown in Table II. This Example demonstrates that the oxygen-scavenging compositions of this invention employing iron, sodium chloride and SAP in a soft, flexible resin provide better oxygen absorbing efficiency than identical compositions in more rigid polyethylenes and polypropylenes such as in concentrates A–D.

TABLE I

Oxygen Absorption Performance of Oxygen-Scavenging Concentrate Pellets in Various Carrier Resins Concentrate Resin Composition:

| | |
|---|---|
| 20 wt % | Iron |
| 20 wt % | Salt |
| 10 wt % | SAP |
| 50 wt % | Carrier Resin |

| Conc No. | Carrier Resin | Type/comonomer | Oxygen Scavenger Concentrate Oxygen Absorption (cc O₂/gm Fe) @22° C., 100% RH | | |
|---|---|---|---|---|---|
| | | | 3 days | 7 days | 28 days |
| I | Dow Affinity PF1140 | mPE/octene | 38,43 | 55,59 | 91,95 |
| II | Dow/DuPont Engage 8440 | mPE/octene | 39,41 | 55,58 | 90,96 |
| III | Exxon Exact 3131 | mPE/hexene | 35 | 52 | 86 |
| IV | Exxon Exact 4053 | mPE/butene | 37 | 53 | 79 |
| V | Exxon Exact 4151 | mPE/hexene | 53 | 71 | 109 |
| VI | Amoco EHPP | mPP/none | 31 | 45 | 76 |
| | | Type/Styrene: Rubber | | | |
| VII | Shell Kraton D2103 | SBS/35:65 | 135 | 166 | 185 |
| VIII | Shell Kraton D2104 | SBS/30:70 | 88 | 125 | 160 |
| IX | Shell Kraton D2109 | SBS/22:78 | 55 | 85 | 121 |
| X | Shell Kraton G2701 | SEBS/37:63 | 37 | 61 | 105 |
| XI | Shell Kraton G2705 | SEBS/30:70 | 42 | 65 | 108 |
| XII | Shell Kraton G2706 | SEBS21:79 | 81 | 105 | 138 |
| XIII | SIBS | SIBS/30:70 | 58 | 79 | 97 |
| | | Type/comonomer | | | |
| XIV | Carbide ULDPE ETS9064 | Unipol/higher olefin | 69 | 103 | 137 |
| XV | Dow VLDPE Attane 4202 | LP Solution/higher olefin | 42 | 58 | 88 |

TABLE I-continued

Oxygen Absorption Performance of Oxygen-Scavenging Concentrate Pellets in Various Carrier Resins

| A | Dow Dowlex LLDPE2032 | Ziegler-Natta/higher olefin | 25 | 35 | 61 |
|---|---|---|---|---|---|
| B | Amoco PP7200p | Ziegler-Natta/none | 13 | 21 | 39 |
| C | Dow LDPE 6401 | Radical/none | 20 | 31 | 60 |
| D | Westlake LDPE EF412 | Radical/none | 20 | 32 | 55 |

TABLE II

Shore Hardness and Secant Modulus Properties of Carrier Resins for Oxygen-Scavenging Composition

| Conc No. | Carrier Resin | Type/comonomer | Shore D | 1% Secant Modulus |
|---|---|---|---|---|
| I | Dow Affinity PF1140 | mPE/octene | 35.6 | 5,155 |
| II | Dow/DuPont Engage 8440 | mPE/octene | 37.2 | 6,600 |
| III | Exxon Exact 3131 | mPE/hexene | 40.6 | 8,448 |
| IV | Exxon Exact 4053 | mPE/butene | 29.9 | 2,866 |
| V | Exxon Exact 4151 | mPE/hexene | 37.7 | 6,563 |
| VI | Amoco EHPP | mPP/none | 19.5 | 1,837 |
| | | Type/Styrene: Rubber | | |
| VII | Shell Kraton D2103 | SBS/35:65 | 19.0 | 1,386 |
| VIII | Shell Kraton D2104 | SBS/30:70 | 8.1 | 829 |
| IX | Shell Kraton D2109 | SBS/22:78 | 10.3 | 454 |
| X | Shell Kraton G2701 | SEBS/37:63 | 12.8 | 1,706 |
| XI | Shell Kraton G2705 | SEBS/30:70 | 9.1 | 1,126 |
| XII | Shell Kraton G2706 | SEBS/21:79 | 5.9 | 188 |
| XIII | SIBS | SIBS/30:70 | 10.9 | 337 |
| | | Type/Comonomer | | |
| XIV | Carbide ULDPE ETS9064 | Unipol/higher olefin | 42.0 | 20,000 |
| XV | Dow VLDPE Attane 4202 | LP Solution/higher olefin | 42.1 | 18,900 |
| A | Dow Dowlex LLDPE2032 | Ziegler-Natta/higher olefin | 47.5 | 37,115 |
| B | Amoco PP7200p | Ziegler-Natta/none | 72.4 | 176,000 |
| C | Dow LDPE 6401 | Radical/none | 46.1 | 26,526 |
| D | Westlake LDPE EF412 | Radical/none | 46.2 | 26,385 |

The oxygen absorption results of Example 11 demonstrate that oxygen-scavenging compositions in soft, flexible resins absorb more oxygen per gram of iron than more rigid, hard resins such as LDPE, LLDPE and PP. Although there is not a linear relationship between the softness and flexibility of a resin and oxygen-absorption, there is a demonstrated improvement between soft, flexible resins on the whole and hard, rigid resins. All of the resins with a Shore D below 45 and 1% secant modulus below about 25,000 p.s.i. absorbed more oxygen per gram of iron than those resins with a Shore D greater than 45 and 1% secant modulus greater than 25,000 p.s.i. It is believed that the flexible molecular structure of soft resins facilitates the intimate contact of the oxygen-scavenging components. This enables the electrolyte and acidifying component to promote the oxidation of the iron in the resin.

As shown in Table I, the styrene-butadiene-styrene block copolymers of the Kraton® D series work particularly well. This improved oxygen absorption may be in part due to the absorption of oxygen by the carbon-carbon double bonds in the butadiene segments of the styrene-butadiene block-copolymer.

EXAMPLE 12

Low density polyethylene oxygen-scavenging films were prepared by blending each of the nineteen concentrates of Example 11, having the same Shore D and 1% secant Modulus properties listed above, with Dow LDPE 640i resin at a 1/1 ratio, and preparing extruded films using a single Haake extruder. The zone temperatures of the extruder barrel were set as follows: zone 1—190° C., zone 2—200° C., zone 3—210° C., and die zone—200° C. The extruded films had a nominal thickness of 5 mils. The resulting films, designated Film I–XV and Comparative Film A–D, were measured for oxygen-scavenging performance according to the Oxygen Absorption Test described above at 72 hr (3 day), 168 hr (7 days), and 672 hr (28 days). The results are tabulated below. This Example demonstrates that the oxygen-scavenging LDPE films of this invention employing iron, sodium chloride and SAP in a soft, flexible carrier resin concentrate blended with the LDPE resin provide better oxygen absorbing efficiency than identical compositions in more rigid polyethylene and polypropylene concentrates A–D blended with LDPE film resin.

TABLE III

Oxygen Absorption Performance of Extrusion Films Containing Oxygen-Scavenging Compositions in Various Carrier Resins Extrusion Film Composition:

| 50 wt % | Concentrate Resin from Table I |
| 50 wt % | LDPE Film Resin |

| Conc No. | Carrier Resin | Type/comonomer | \multicolumn{3}{c}{Oxygen Scavenger Concentrate Oxygen Absorption (cc O$_2$/gm Fe) @22° C., 100% RH} |
|---|---|---|---|---|---|
| | | | 3 days | 7 days | 28 days |
| I | Dow Affinity PF1140 | mPE/octene | 77 | 96 | 126 |
| II | Dow/DuPont Engage 8440 | mPE/octene | 54 | 64 | 84 |
| III | Exxon Exact 3131 | mPE/hexene | 82 | 100 | 127 |
| IV | Exxon Exact 4053 | mPE/butene | 64 | 73 | 92 |
| V | Exxon Exact 4151 | mPE/hexene | 75 | 88 | 116 |
| VI | Amoco EHPP | mPP/none | 73 | 85 | 94 |
| | | Type/Styrene:Rubber | | | |
| VII | Shell Kraton D2103 | SBS/35:65 | 110 | 128 | 143 |
| VIII | Shell Kraton D2104 | SBS/30:70 | 85 | 95 | 111 |
| IX | Shell Kraton D2109 | SBS/22:78 | 104 | 156 | 187 |
| X | Shell Kraton G2701 | SEBS/37:63 | 47 | 64 | 81 |
| XI | Shell Kraton G2705 | SEBS/30:70 | 47 | 62 | 79 |
| XII | Shell Kraton G2706 | SEBS/21:79 | 63 | 69 | 84 |
| XIII | SIBS | SIBS/30:70 | 80 | 107 | 122 |
| | | Type/comonomer | | | |
| XIV | Carbide ULDPE ET59064 | Unipol/higher olefin | 57 | 68 | 87 |
| XV | Dow VLDPE Attane 4202 | LP Solution/higher olefin | 66 | 88 | 119 |
| A | Dow Dowlex LLDPE2032 | Ziegler-Natta/higher olefin | 36 | 40 | 61 |
| B | Amoco PP7200p | Ziegler-Natta/none | 18 | 28 | 43 |
| C | Dow LDPE 6401 | Radical/none | 44 | 57 | 79 |
| D | Westlake LDPE EF412 | Radical/none | 44 | 51 | 65 |

The oxygen absorption results of Example 12 demonstrate that oxygen-scavenging compositions in soft, flexible resin concentrates that are further blended with LDPE to form LDPE films, absorb more oxygen per gram of iron than those same compositions in more rigid, hard concentrate resins further blended with LDPE to form LDPE films. Comparison of the results from Example 11 to Example 12, shows that some resins absorbed oxygen more effectively in concentrate form. But, overall, the soft, flexible carrier resins performed better than the hard, rigid carrier resins in concentrates and films. It is believed that the difference between concentrate vs. film absorption results may be due to the compatibility of the concentrate carrier and film resin. We believe that if the concentrate carrier resin is miscible in the film resin when blended with the film resin, the regions of soft, flexible resin containing the oxygen-scavenging composition may not exist. If those regions do not exist, the hard, stiff film resin may effect the oxygen absorption ability of the oxygen-scavenging composition in the same manner the hard, stiff resins lower absorption in the resin concentrate form. For example, the Kraton G series absorbs more oxygen per gram of iron in the concentrate form versus the LDPE film. This may be due to the fact that styrene-ethylene-butylene styrene block copolymers are readily miscible in LDPE. This miscibility may cause the break down of the soft, flexible resin regions, leaving the oxygen-scavenging components in the more rigid LDPE resin.

EXAMPLE 13

In accordance with Example 11, a dry-mix preparation of oxygen scavenger ingredients was carried out in the following manner: Iron powder (SCM A-131); sodium chloride (Morton EF325); and sodium acid pyrophosphate (Monsanto SAP-28) were mixed at 2/2/1 ratio of Fe/NaCl/SAP in an intensive mixing Henschel mixer. The powder mixture was compounded into two separate resins (Dow/DuPont Engage 8440 and Dow Affinity PF1140) at a 1/1 weight ratio on a twin-screw ZSK-30 extruder to make concentrate pellets of oxygen scavenger resin designated Concentrates C-1 and C-2. Polypropylene oxygen-scavenging films were prepared by blending each of the concentrates with Amoco PP6219 polypropylene resin at a 1/1 ratio, and preparing 5 ml extrusion films using a single screw Haake extruder in accordance with Example 12. The resulting films, designated F-1 and F-2, were measured for oxygen-scavenging performance according to the Oxygen Absorption Test described above at 72 hr (3 day), 168 hr (7 days), and 672 hr (28 days). The results are tabulated below. This Example demonstrates that mPE is as effective as a carrier resin in polypropylene as a diluent as it is when LDPE is the diluent.

| \multicolumn{2}{c}{Concentrate Resin Composition:} | |
|---|---|
| 20 wt % | Iron |
| 20 wt % | Salt |
| 0 wt % | Clay |
| 10 wt % | SAP |
| 50 wt % | Carrier Resin |

| Conc. No. | Carrier Resin | Type/comonomer |
|---|---|---|
| C-1 | Dow/DuPont Engage 8440 | mPE/octene |
| C-2 | Dow Affinity PP1140 | mPE/octene |

| | Extrusion Film Composition: | | | |
|---|---|---|---|---|
| | 50 wt % | Concentrate Resin C1–C2 | | |
| | 50 wt % | Amoco PP6219 Film Resin | | |

| Film | | Oxygen Scavenger Extrusion Film Oxygen Absorption (cc $O_2$/gm Fe) @22 °C., 100% RH | | |
|---|---|---|---|---|
| No. | Concentrate | 3 days | 7 days | 28 days |
| F-1 | C-1 | 56 | 77 | 108 |
| F-2 | C-2 | 59 | 96 | 110 |

The following Examples 14–16 demonstrate the effect of dehydrated acidifying components on the appearance and oxygen-absorption of the oxygen-scavenging films. In each of the Examples below, a high extrusion temperature—above 270° C.—was used to approximate the high temperature extrusion coating process temperature.

EXAMPLE 14

Calcination of SAP

Commercial food-grade sodium acid pyrophosphate ($Na_2H_2P_2O_7$, Monsanto SAP-28) was calcined at 350° C. for 2 hours in a microwave furnace to give a dehydrated product. The weight loss during calcination was 8.1 wt %. The pH of a 0.1 wt % aqueous slurry/solution of dehydrated SAP was 5.6. The dehydrated SAP was ground and sifted into a fine powder, and then mixed with iron powder (SCM A-131), salt powder (Morton EF325) at 2/2/1 weight ratio of iron/salt/dehydrated SAP in an intensive mixing Waring mixer. The powder mixture was further mixed with Exxon LLDPE resin powder (Escorene LL-5002.09) at 1/3 ratio of inorganic/resin in the mixer.

The mixture of oxygen scavenger components and resin was compounded into an oxygen scavenger resin composition, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film I) showed clean and smooth appearance with no voids or bubbles in the film. The oxygen absorption performance of the film sample was measured and found to be good, as shown in Table IV.

For comparison, commercial food-grade sodium acid pyrophosphate ($Na_2H_2P_2O_7$, Monsanto SAP-28) was used without calcination. The pH of the 0.1 wt % aqueous slurry/solution of SAP was 4.2. It was mixed with iron powder (SCM A-131), salt powder (Morton EF325) at 2/2/1 weight ratio of iron/salt/SAP in an intensive mixing Waring mixer. The powder mixture was further mixed with Exxon LLDPE resin powder (Escorene LL-5002.09) at 1/3 ratio of inorganic/resin in the mixer.

The mixture of oxygen scavenger components and resin was compounded into an oxygen scavenger resin, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film A) showed poor appearance with many large voids and bubbles in the film. The oxygen absorption performance of the film sample was measured and found to be very good, as shown in Table IV.

EXAMPLE 15

Calcination of MCP

Commercial food-grade monocalcium phosphate monohydrate ($CaH_4(PO_4)_2 \cdot H_2O$, Rhone-Poulenc Regent 12xx) was calcined at 350° C. for 2 hours in a microwave furnace to give a dehydrated product. The weight loss during calcination was 18.6 wt %. The pH of the 0.1 wt % aqueous slurry/solution of dehydrated MCP was 3.0.

It was ground and sifted into a fine powder, and then mixed with iron powder (SCM A-131), salt powder (Morton EF325) at 2/2/1 weight ratio of iron/salt/dehydrated MCP in an intensive mixing Waring mixer. The powder mixture was further mixed with Exxon LLDPE resin powder (Escorene LL-5002.09) at 1/3 ratio of inorganic/resin in the mixer.

The mixture of oxygen scavenger components and resin was compounded into an oxygen scavenger resin, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film II) showed clean and smooth appearance with no voids or bubbles in the film. The oxygen absorption performance of the film sample was measured and found to be good, as shown in Table IV.

For comparison, commercial food-grade monocalcium phosphate monohydrate ($CaH_4(PO_4)_2 \cdot H_2O$, Rhone-Poulenc Regent 12xx) was used without calcination. The pH of the 0.1 wt % aqueous (slurry) solution of MCP was 4.0. It was mixed with iron powder (SCM A-131), salt powder (Morton EF325) at 2/2/1 weight ratio of iron/salt/MCP in an intensive mixing Waring mixer. The powder mixture was further mixed with Exxon LLDPE resin powder (Escorene LL-5002.09) at 1/3 ratio of inorganic/resin in the mixer.

The mixture of oxygen scavenger components and resin was compounded into an oxygen scavenger resin, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film B) showed poor appearance with many large voids and bubbles in the film. The oxygen absorption performance of the film sample was measured and found to be very good, as shown in Table IV.

EXAMPLE 16

Calcination of STMP

Commercial food-grade sodium trimetaphosphate (($NaPO_3)_3$, Monsanto STMP) was calcined at 350° C. for 1 hour in a microwave furnace to give a dehydrated product. The weight loss during calcination was 0.5 wt %. The pH of the 0.1 wt % aqueous slurry/solution of dehydrated STMP was 5.4. It was ground and sifted into a fine powder, and then mixed with iron powder (SCM A-131), salt powder (Morton EF325) at 2/2/1 weight ratio of iron/salt/dehydrated STMP in an intensive mixing Waring mixer. The powder mixture was further mixed with Exxon LLDPE resin powder (Escorene LL-5002.09) at 1/3 ratio of inorganic/resin in the mixer.

The mixture of oxygen scavenger and resin was compounded into an oxygen scavenger resin, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film III) showed clean and smooth appearance with no voids or bubbles in the film. The oxygen absorption performance of the film sample was measured and found to be good, as shown in Table IV.

For comparison, commercial food-grade sodium trimetaphosphate (($NaPO_3)_3$, Monsanto STMP) was used without calcination. The pH of the 0.1 wt % aqueous (slurry) solution of STMP was 5.2. It was mixed with iron powder (SCM A-131), salt powder (Morton EF325) at 2/2/1 weight ratio of iron/salt/STMP in an intensive mixing Waring mixer. The powder mixture was further mixed with Exxon LLDPE resin powder (Escorene LL-5002.09) at 1/3 ratio inorganic/resin in the mixer.

The mixture of oxygen scavenger and resin was compounded into an oxygen scavenger resin, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film C) showed somewhat poor appearance with minor/small voids and bubbles in the film. The oxygen absorption performance of the film sample was measured and found to be good, as shown in Table IV.

COUNTER EXAMPLE D
No Acidifying Component

Iron powder (SCM A-131) and salt powder (Morton EF325) were mixed at 1/1 ratio in an intensive mixing Waring mixer. No acidifying component was used in the formulation. The powder mixture was further mixed with Exxon LLDPE resin powder (Escorene LL-5002.09) at 1/3 ratio of inorganic/resin in the mixer.

The mixture of oxygen scavenger and resin was compounded into an oxygen scavenger resin, and further made into extruded film on a Haake extruder at 310° C. The extruder temperature profile was 280, 295, 310, and 265° C. at Zone 1, 2, 3 and 4 (die). The polymer melt temperature was 310° C. The extruded film (designated Film D) showed clean and smooth appearance with no voids or bubbles in the film. The oxygen absorption performance of the film sample was measured and found to be poor, as shown in Table IV.

TABLE IV

Oxygen Absorption Performance of Oxygen-Scavenging Films

| Sample ID | pH Modifier | Film Appearance | Oxygen Absorption (cc O2/gm Fe) after 6 days, @ 22° C., 100% RH |
|---|---|---|---|
| Film I | Calcined SAP | Good, no voids | 44.0 |
| Film II | Calcined MCP | Good, no voids | 65.5 |
| Film III | Calcined STMP | Good, no voids | 38.5 |
| Film A | SAP | Poor, many large voids | 165 |
| Film B | MCP | Poor, many large voids | 158 |
| Film C | STMP | Somewhat poor, minor voids | 53.0 |
| Film D | No acidifying component | Good, no voids | 12.2 |

The oxygen-absorption results of Table IV demonstrate two important points. First, that use of an acidifying component improves the oxygen absorption of the iron regardless of whether the acidifying component contains hydrate or is dehydrated. Second, that there is a trade-off between oxygen absorption and film appearance when using hydrated versus dehydrated acidifying components. If the fabrication temperature of the film or article is below the dehydration temperature of the hydrated acidifying component, then the hydrated acidifying component may be used without the creation of voids or bubbles. If, however, the fabrication temperature is above the dehydration temperature of the hydrated acidifying component, a calcined acidifying component should be used. Although the oxygen absorption decreases when calcined acidifying components are used, the film appearance is smooth with no voids or bubbles. The selection of acidifying component will depend on the end-use application, but an acidifying component—hydrated or calcined—should always be used to achieve increased oxygen absorption.

We claim:

1. A process for preparing an oxygen-scavenging thermoplastic resin composition, which process comprises the steps of calcining in a furnace or kiln a non-electrolytic acidifying component so that it is dehydrated, preparing a resin mixture comprising an oxidizable metal component, an electrolyte component, the calcined non-electrolytic acidifying component and a thermoplastic resin and melt compounding the resin mixture, wherein the oxidizable metal component is selected from the group consisting of iron, zinc, copper, aluminum, tin and compounds thereof, with the proviso that copper acetate is excluded, and wherein the non-electrolytic acidifying component is selected from the group consisting of monocalcium phosphate, sodium acid pyrophosphate, sodium metaphosphate, sodium trimetaphosphate, sodium phosphate monobasic, sodium hexametaphosphate, potassium phosphate monobasic, potassium acid pyrophosphate and combinations thereof.

2. A process according to claim 1 wherein the non-electrolytic acidifying component is sodium acid pyrophosphate, monocalcium phosphate or combinations thereof.

3. A process according to claim 1 wherein about 10 to about 200 parts by weight electrolyte component and non-electrolytic acidifying component are added per 100 parts by weight oxidizable metal.

4. A process according to claim 1 in which not more than 500 ppm of water is present in the resin mixture prior to melt compounding.

5. A process according to claim 1 in which not more than 200 ppm of water is present in the resin mixture prior to melt compounding.

* * * * *